US012584833B2

(12) United States Patent
Schryver et al.

(10) Patent No.: US 12,584,833 B2
(45) Date of Patent: Mar. 24, 2026

(54) SYSTEMS, DEVICES, AND METHODS FOR AUTOMATED THAWING OF BAG-FORMAT STORAGE VESSELS

(71) Applicant: BioLife Solutions, Inc., Bothell, WA (US)

(72) Inventors: Brian Schryver, Redwood City, CA (US); Scott Comiso, Menlo Park, CA (US); Thomas McPherson, San Rafael, CA (US)

(73) Assignee: BioLife Solutions, Inc., Bothell, WA (US)

( * ) Notice: Subject to any disclaimer, the term of this patent is extended or adjusted under 35 U.S.C. 154(b) by 1389 days.

(21) Appl. No.: 16/054,454

(22) Filed: Aug. 3, 2018

(65) Prior Publication Data

US 2019/0041308 A1 Feb. 7, 2019

Related U.S. Application Data

(60) Provisional application No. 62/540,976, filed on Aug. 3, 2017.

(51) Int. Cl.
  *G01N 1/42* (2006.01)
  *A01N 1/142* (2025.01)
  (Continued)

(52) U.S. Cl.
  CPC .............. *G01N 1/42* (2013.01); *A01N 1/142* (2025.01); *A01N 1/145* (2025.01); *B01L 7/00* (2013.01);
  (Continued)

(58) Field of Classification Search
  CPC .......... G01N 1/42; G01N 1/44; A01N 1/0242; A01N 1/0257; A01N 1/0263; A01N 1/0284; B01L 7/00; B01L 3/505; B01L 7/50; B01L 2200/147; B01L 2300/0809; B01L 2300/123; B01L 2300/1827; H05B 1/025;
  (Continued)

(56) References Cited

U.S. PATENT DOCUMENTS 3,535,494 A 10/1970 Armbruster
4,309,592 A * 1/1982 Le Boeuf .............. A61M 1/369
 165/46

(Continued)

FOREIGN PATENT DOCUMENTS

DE 102013221804 A1 * 4/2015 .......... A61M 1/0281
EP 0861014 A1 8/1998
(Continued)

*Primary Examiner* — Vy T Nguyen
(74) *Attorney, Agent, or Firm* — Brown & Michaels, PC

(57) ABSTRACT

The present invention discloses sample thawing devices, systems, and methods, that are configured to take bag-format sample vessels, referred to as "cryobags", and to thaw the contents of such cryobags. The contents of such cryobags are samples with cells, and the thawing of such samples is based on the temperature, volume, and mass of the sample in order to evenly distribute heat and avoid ice crystallization damage to the cells during thawing. Paired heater plates form an assembly configured to support, clamp, and thaw individual cryobags. The heater plate pair has an articulated member that is repositioning to provide for ease in inserting and removing samples.

21 Claims, 12 Drawing Sheets

(51) Int. Cl.

| | |
|---|---|
| *A01N 1/145* | (2025.01) |
| *A01N 1/146* | (2025.01) |
| *A01N 1/162* | (2025.01) |
| *B01L 3/00* | (2006.01) |
| *B01L 7/00* | (2006.01) |
| *G01N 1/44* | (2006.01) |
| *H05B 1/02* | (2006.01) |

(52) U.S. Cl.
CPC .............. *G01N 1/44* (2013.01); *H05B 1/025* (2013.01); *A01N 1/146* (2025.01); *A01N 1/162* (2025.01); *B01L 3/505* (2013.01); *B01L 7/50* (2013.01); *B01L 2200/147* (2013.01); *B01L 2300/0809* (2013.01); *B01L 2300/123* (2013.01); *B01L 2300/1827* (2013.01)

(58) Field of Classification Search
CPC ........... H05B 3/30; A61M 1/369; A61M 5/44; A61M 2205/3653
USPC .......... 219/438–443.1, 445.1–446.1, 448.12, 219/449.1–450.1, 453.11–453.13, 219/520–525
See application file for complete search history.

(56) References Cited

U.S. PATENT DOCUMENTS

| | | | | |
|---|---|---|---|---|
| 4,473,739 | A * | 9/1984 | Scheiwe | ............... A61M 5/445 |
| | | | | 219/385 |
| H1623 | H | 1/1997 | Reed et al. | |
| 5,635,093 | A | 6/1997 | Arena et al. | |
| 7,057,140 | B2 * | 6/2006 | Pittman | .................... H05B 3/28 |
| | | | | 392/485 |
| 7,445,756 | B2 * | 11/2008 | Moore | ................. A61L 2/0082 |
| | | | | 422/561 |

| | | | | |
|---|---|---|---|---|
| 8,359,970 | B2 * | 1/2013 | Calzada | .................... A23L 5/10 |
| | | | | 99/344 |
| 8,680,439 | B2 * | 3/2014 | Shei | ........................ A47J 39/02 |
| | | | | 219/402 |
| 2004/0265168 | A1 * | 12/2004 | Bakke | ................ A61M 1/0281 |
| | | | | 165/104.31 |
| 2006/0027555 | A1 | 2/2006 | Aisenbrey | |
| 2006/0221801 | A1 * | 10/2006 | Eberdorfer | .......... G11B 25/043 |
| | | | | 369/124.01 |
| 2011/0286492 | A1 * | 11/2011 | Auret | ................... G01N 17/008 |
| | | | | 374/1 |
| 2012/0238901 | A1 | 9/2012 | Augustine | |
| 2013/0319995 | A1 | 12/2013 | Bringe et al. | |
| 2014/0220196 | A1 * | 8/2014 | Veloo | ........................ A23L 5/10 |
| | | | | 426/233 |
| 2015/0125138 | A1 | 5/2015 | Karnieli et al. | |
| 2015/0132450 | A1 * | 5/2015 | Pitteurs | ................ A47J 37/0611 |
| | | | | 426/233 |
| 2015/0289817 | A1 * | 10/2015 | Augustine | .............. A61B 18/16 |
| | | | | 600/372 |
| 2015/0334774 | A1 * | 11/2015 | Schryver | .................. G01K 7/22 |
| | | | | 219/442 |
| 2016/0097583 | A1 * | 4/2016 | Baust | ..................... C12M 41/48 |
| | | | | 62/129 |
| 2018/0238843 | A1 * | 8/2018 | Creissen | .................. G01N 1/30 |

FOREIGN PATENT DOCUMENTS

| | | | | | | |
|---|---|---|---|---|---|---|
| EP | | 1477781 | A1 * | 11/2004 | .......... G01F 1/6845 |
| JP | | S58225019 | A | 12/1983 | |
| JP | | H07185362 | A | 7/1995 | |
| JP | | 2002120805 | A | 4/2002 | |
| JP | | 2004103480 | A | 4/2004 | |
| JP | | 2013252204 | A * | 12/2013 | |
| WO | WO-2016023034 | A1 * | 2/2016 | .......... A01N 1/0263 |

* cited by examiner

100

105

110

115

100

230

675

SYSTEMS, DEVICES, AND METHODS FOR AUTOMATED THAWING OF BAG-FORMAT STORAGE VESSELS

CROSS-REFERENCE TO RELATED APPLICATIONS

The present application is a Non-Provisional which claims priority to U.S. Provisional Application No. 62/540,976, filed Aug. 3, 2017, the full disclosure which is incorporated herein by reference in its entirety for all purposes.

FIELD OF THE INVENTION

The present disclosure is generally related to systems and methods for thawing a frozen sample in a bag-format storage vessel. In various aspects, the present disclosure relates to the cryogenic preservation of cells, tissues, and fluids, and to systems, devices, and methods for the recovery of cryogenically-preserved cells, tissues, and fluids.

BACKGROUND

Cryogenic preservation of cells in suspension is a well-established and accepted technique for long term archival storage and recovery of live cells. As a general method, cells are suspended in a cryopreservation media typically including salt solutions, buffers, nutrients, growth factors, proteins, and cryopreservatives. The cells are then distributed to archival storage containers of the desired size and volume, and the containers are then reduced in temperature until the container contents are frozen. Typical long-term archival conditions include liquid nitrogen vapor storage where temperatures are typically between −196° C. and −150° C. Vials or bag-format storage vessels can be used to store such sample fluids, as appropriate for the given volume or application of the cryopreserved sample.

The successful recovery of live cells preserved by such methods may be dependent upon minimizing injurious ice crystal growth in the intracellular region during both the freezing and thawing processes. Some advances have been made to reduce intracellular ice crystal growth during the freezing process. For example, intracellular ice crystal growth may be reduced by adding a cryoprotectant compound to the tissues or cell suspension solution that inhibits ice crystal nucleation and growth both extracellularly and intracellularly. Additionally, the growth of intracellular ice can be controlled through management of the rate of sample temperature reduction. During the freezing process extracellular ice crystal formation will exclude solutes and cells from the developing ice crystal structure thereby concentrating the solutes and cells in the remaining liquid phase. The increase in solute concentration will establish an osmotic potential that will promote the dehydration of the cells while allowing time for cell membrane-permeable cryoprotectants to equilibrate in concentration within the intracellular volume. As the freezing process progresses, a temperature will be reached at which the high solute concentration will solidify in a glass state with minimal size of ice crystal nuclei within the intracellular volume. The solid-state cell suspension is then further reduced in temperature until the cryogenic storage temperature is reached. At this temperature, molecular activity is sufficiently reduced that the cells may be stored indefinitely. For optimal cell recovery following cryogenic storage, the rate of temperature reduction during the freezing process must fall within a range of values. If the temperature reduction rate is too fast, the cells may freeze before the level of intracellular water has been sufficiently reduced, thereby promoting the growth of intracellular ice crystals. If the rate of temperature reduction is too slow, the cells may become excessively dehydrated and the extracellular solute concentration may become too high, with both cases leading to damage of critical cellular structures. For this reason, the temperature reduction rate during the freezing process is typically controlled. For example, one method of controlling the rate of temperature reduction includes surrounding the sample with an insulating material and placing the assembly in a static temperature environment, while another method includes placing the exposed sample container into an isolation chamber in which the interior temperature is reduced at a controlled rate.

Returning the sample from the cryogenic archival state involves thawing the sample to a fully liquid state. During the thawing process, again the rate of temperature change can influence the viability of the cryogenically preserved cells. The solid contents of the sample storage vessels contain large islands of crystallized water which are interposed by channels of glass state aqueous solutes intermixed with small nuclei of ice crystals. During the transition from the cryogenic storage temperature to the conclusion of the phase change to a completely liquid state, there is an opportunity for rearrangement of the water molecules within the sample including a thermodynamically favored extension of the small ice nuclei within the cells. As the growth of the intracellular ice crystals have an associated potential for cell damage, and as the degree of crystal growth is a time-dependent the phenomenon, minimizing the time interval of the transition through the phase change is desirable. A rapid slew rate in the sample vessel temperature is typically achieved by partial submersion of the vessel in a water bath set to a temperature of approximately 37° C. Although a faster rate of thawing can be achieved by increasing the temperature of the bath, submersion of the vessel in the bath will establish temperature gradients within the vessel with the highest temperatures being located at the vessel wall. As a result, transient thermodynamic states will occur wherein the temperature of the liquid-solid mixture will exceed the melting temperature even though frozen material is present in close proximity. The intra-vessel temperature gradient therefore places an upper limit on the bath temperature. In addition, as common cryoprotectants have a known toxic influence on the cells, differential exposure of the cells in the liquid state with respect to time and temperature allows for variation in the viability of the cells upon completion of the thaw process. As the toxic effect of the cryoprotectants is enhanced at elevated temperatures, a lower liquid temperature is desirable. For this reason, common thawing protocols typically include a rapid thaw phase that is terminated when a small amount of solid material still remains in the sample container. Following removal from the water bath, the sample temperature will quickly equilibrate to a temperature that is near to the phase change temperature. Thawing protocols typically seek to minimize the duration at which the thawed sample is held in a state where the cryoprotectant is concentrated, and subsequent steps to dilute the sample or exchange the cryopreservation media for culture media are commonly applied in as short of an interval as possible.

While some thawing devices have been proposed to automate sample thawing, further improvements may be had, particularly with regard to samples stored in bag-format cryopreservation vessels (referred to as "cryobags").

SUMMARY OF THE DISCLOSURE

For thawing cells stored in a cryobag, conventional practice is to warm the cells quickly in a warm water bath (e.g., 37° C.) to just about the point at which the last bit of ice is about to melt, and then to dilute the cells slowly into growth media. If the sample is allowed to get too warm, the cells may start to metabolize, and be poisoned by the dimethyl sulfoxide (DMSO) that is often used in the freezing process. Generally, the thawing of cryogenically preserved cells and tissue is performed by lab technicians, and the applied protocol can not only vary between each lab technician, but may also be technique dependent. The completion of sample thaw is generally subjectively judged by each individual technician and may result in variation in the thaw rate or in samples which have been allowed to become too warm. Although a repeatable thawing profile is theoretically possible to achieve using a bath and manual control of the cryobag insertion, expected variance in both technique and degree of protocol compliance, particularly combined with the requirement to frequently remove the cryobag from bath to monitor the thaw status, makes deviation from the standard profile a near certainty. The removal of the cryobag from the bath interrupts the thermal energy transfer from the bath water to the cryobag and visual assessment of the thaw status is often difficult and may be complicated by the presence of labels and printed writing surfaces that are provided as integrated features of the cryobag product. Further, water baths are also a source of contamination and inadvertent submersion of the cryobag sealing junction can result in the introduction of bath liquid into the cryobag contents during opening or removal of the cryobag sealing junction.

Systems, devices, and methods that provide simplified, automated, and/or more consistent sample thawing may be advantageous and may increase cell recovery. While some thawing devices and methods have been proposed, further improvements may be desirable. For example, in some instances, it may be advantageous to increase a heat transfer rate, especially when thawing larger cells and/or multicellular organisms. Additionally, it may be advantageous to increase the portability of a thawing device such that the device may be used in field applications, such as remote vaccination using live cells or organisms. Embodiments of the disclosure may address one or more of these issues.

In some embodiments, the disclosed sample thawing device is configured for thawing a frozen sample in a bag-format vessel and includes: a housing; a cantilever assembly which supports an upper heating plate, the upper heating plate having a top surface thermally coupled to a first plurality of resistive heaters; a drawer assembly, which can actuate between an open (extended) and a closed (retracted) position, the drawer assembly supporting a lower heating plate, where the lower heating plate has a top surface configured to receive a bag-format vessel and a bottom surface thermally coupled to a second plurality of resistive heaters; and one or more thermal sensors, embedded in the lower heating plate, where the thermal sensors each having a contact disc centered within an insulation disc exposed on a top surface of the lower heating plate.

In some aspects of the bag-format vessel sample thawing device, members of the first plurality of resistive heaters are independently controllable, adapted to control the temperature of localized regions of the upper heating plate. Similarly, in other aspects, members of the second plurality of resistive heaters are independently controllable, adapted to control the temperature of localized regions of the lower heating plate. In some aspects, the upper heating plate has a bottom surface, configured to clamp down on and apply pressure to a bag-format vessel. In further aspects, the sample thawing device further includes: a screw-drive motor configured to drive a clamping motion of the cantilever assembly; and a drawer drive motor configured to drive the drawer assembly between the open position and the closed position. In other aspects, the sample thawing device further includes a rocker motor configured to drive the upper heater plate in an oscillating rocking motion. In some implementations, the one or more thermal sensors are arranged linearly along a lateral mid-line of the lower heater plate. In some embodiments, the sample thawing device can also further include: a touchscreen interface; and a control unit, configured to receive instructions through the touchscreen interface, and configured to control a feedback circuit that regulates the temperature or powering of the first plurality of resistive heaters, the temperature or powering of the second plurality of resistive heaters, or a combination thereof. In some aspects, the insulation disc can be a semi-rigid foam material. In other aspects, sample thawing device can have a lower heating plate that is configured to receive bag-format vessels for sample volumes of from 10 ml to 500 ml.

In other embodiments, the disclosed sample thawing system is configured for thawing a frozen sample in a cryobag and includes: an upper heater plate, supported by a cantilever assembly, the upper heating plate having two or more mat heaters affixed to a top surface of the upper heating plate; a lower heater plate configured to support a cryobag, resting in a drawer assembly, the lower heating plate having two or more mat heaters affixed to a bottom surface of the lower heating plate; a plurality of sensor islands, located in the lower heater plate, configured and arranged to measure a temperature of a cryobag sitting on the lower heater plate (when a cryobag is present); a control unit, configured to control each of the mat heaters affixed to the upper heating plate and the lower heating plate; and a communication module, configured to collect and transmit sample data relating to a sample held within the cryobag.

In other embodiments, the present disclosure is directed to a method for thawing a frozen sample in a bag-format vessel, including the steps of: loading a bag-format vessel into an open sample drawer of a sample thawing device, onto a lower heater plate; closing the sample drawer; clamping down on the bag-format vessel with an upper heating plate, supported by a cantilever assembly; holding the bag-format vessel between the lower heater plate and the upper heating plate; heating the bag-format vessel with both the lower heater plate and the upper heating plate; measuring temperature at one or more locations of the bag-format vessel; adjusting the temperature of both the lower heater plate and the upper heating plate based on feedback from the temperature measurements; ending the heating of the bag-format vessel at when the a measured temperature reaches a threshold.

Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

DETAILED DESCRIPTION OF THE DISCLOSURE

Figure 1A:
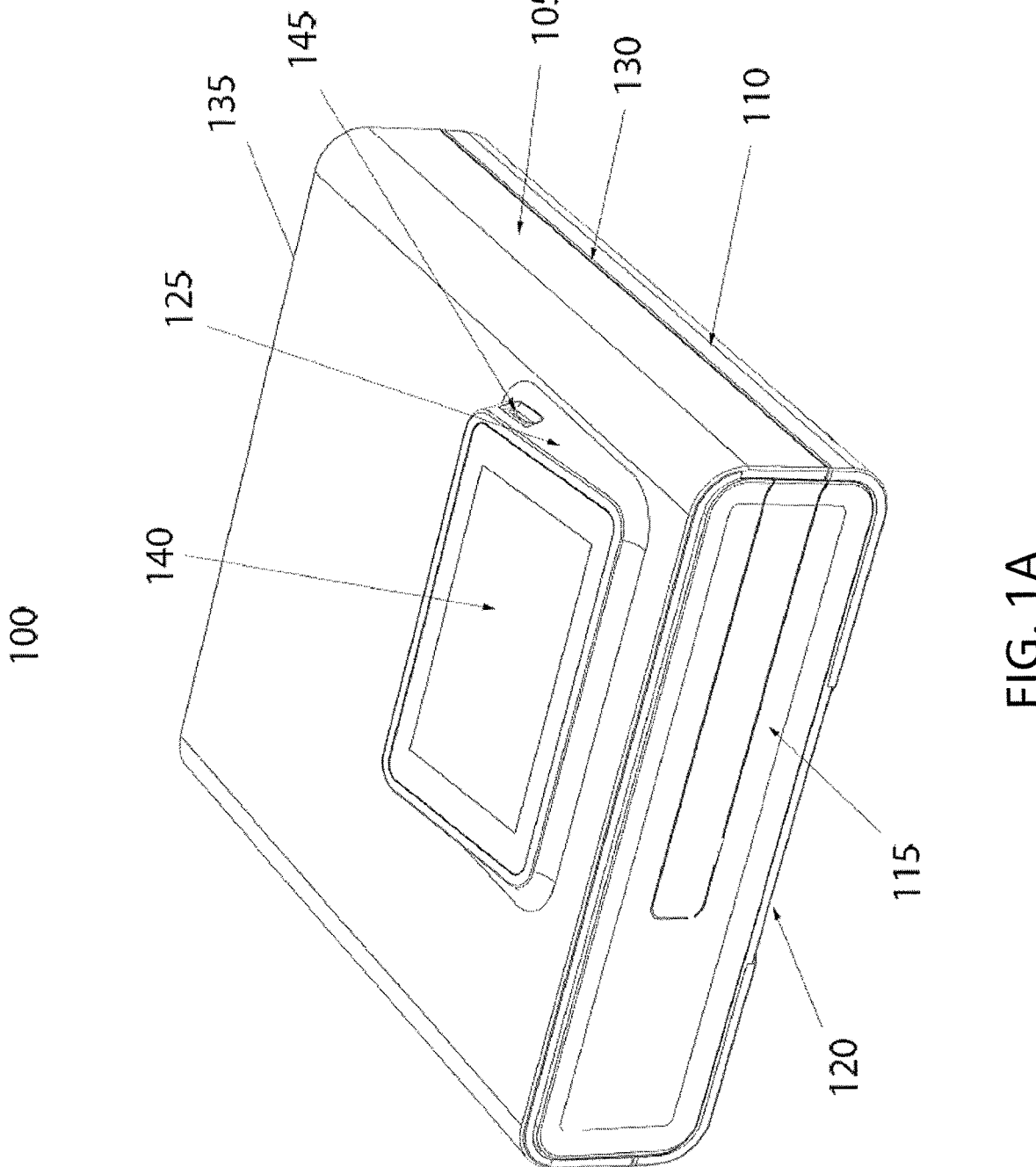
FIG. 1A illustrates a perspective view of the exterior of a sample thawing apparatus, according to various embodiments.

The subject matter of embodiments of the present invention is described here with specificity, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The present disclosure describes various embodiments for the thermal control and/or thawing of organic samples, along with associated devices, systems, and methods. Certain details are set forth in the following description and in the Figures to provide a thorough understanding of various embodiments of the present technology. Other details describing known structures and systems often associated with heating and/or cooling processes, motors, etc., however, are not set forth below to avoid unnecessarily obscuring the description of the various embodiments of the present technology. Many of the details, dimensions, angles and other features shown in the Figures are merely illustrative of particular embodiments. Accordingly, other embodiments can include other details, dimensions, angles and features without departing from the spirit or scope of the present invention. Various embodiments of the present technology can also include structures other than those shown in the Figures and are expressly not limited to the structures shown in the Figures. Moreover, the various elements and features shown in the Figures may not be drawn to scale. In the Figures, identical reference numbers identify identical or at least generally similar elements.

As used herein, the term "substantially" refers to the complete or nearly complete extent or degree of an action, characteristic, property, state, structure, item, or result. For example, an object that is "substantially" uniform in height to another object would mean that the objects are either completely or nearly completely uniform in height. The exact allowable degree of deviation from absolute completeness may in some cases depend on the specific context, however, generally speaking, the nearness of completion will be so as to have the same overall result as if absolute and total completion were obtained.

Wherever used throughout the disclosure and claims, the term "generally" has the meaning of "approximately" or "closely" or "within the vicinity or range of". The term "generally" as used herein is not intended as a vague or imprecise expansion on the term it is selected to modify but rather, as a clarification and potential stop gap directed at those who wish to otherwise practice the appended claims but seek to avoid them by insignificant, or immaterial or small variations. All such insignificant, or immaterial or small variations should be covered as part of the appended claims by use of the term "generally".

As used herein, the term "about" is used to provide flexibility to a numerical range endpoint by providing that a given value may be greater than or less than the indicated value. In particular, the given value modified by "about" may be at or within ±10% from that value.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In some embodiments of the invention, direct liquid contact with the cryobag exterior can be eliminated, as opposed to complete or partial submersion of the cryobag vessel in a water bath. As such, in many embodiments of the disclosure, the exterior surface of the cryobag (which can include the vessel exterior plus laminations such as labels or shrink-wrap sleeves, or secondary containment bags) will be in contact only with solid materials, for example, shaped and arranged as heater plates. In some aspects, the solid material in contact with the vessel exterior can be a homogenous solid, while in other cases, the solid material can be a complex material. In some embodiments the solid material can be formed from aluminum, copper, zinc, magnesium, titanium, iron, chromium, nickel, carbon, or alloys of the same elements. In some such aspects, the solid material can have a thermal conductivity of greater than ten Watts per meter-Kelvin ($\kappa$>10.0 W/(m·K)). In other embodiments, the solid material can be formed from a synthetic material, such as a polymer or ceramic. In further embodiments, the solid material can be formed from a synthetic thermally-conductive pliable material such as a silicone polymer foam or putty. In some such aspects, the solid material can have a thermal conductivity of greater than 0.2 Watts per meter-Kelvin ($\kappa$>0.2 W/(m·K)). In some aspects, the solid material can be formed from a combination of materials, for example and without limitation, a conductive pliable material and a metal alloy.

In some embodiments, the solid materials formed as heater plates for holding and contacting the sample vessel include one or more heater elements for the purpose of increasing the temperature of the solid material, such that when a sample vessel is placed onto or in between the heater plates, thermal energy will migrate into the sample vessel from the solid material. In various aspects, the heater elements mechanically and/or thermally connected to the heater plates can be electrically resistive heaters or thermo-electric element heaters. In other aspects, the heater plates can be alternatively heated and cooled by a thermoelectric element. In further aspects, the heater plates can include one or more temperature sensors that can detect the temperature of the assembly, and provide an analog or digital signal to a microcontroller that is configured to interpret the thermo-metric signal and thereby regulate the power level or duty cycle supplied to the heater elements in order to maintain the temperature of the heater plates at the desired temperature.

A typical operational temperature for a thawing device as disclosed herein will be 37° C. or greater, as the disclosed device will likely be used in applications to replace the performance of a water bath in existing experimental protocols. The range of operational temperatures that can be achieved by the present thawing device is much broader and much more readily controlled than standard water baths. In some aspects, an initial operational temperature can be set within a range from 30° C. to 60° C., or at any increment or gradient of temperature within that range. In other aspects, an initial operational temperature can be set within a range from 45° C. to 50° C. It should be appreciated that the present thawing device can start a process at a certain working operational temperature and then adjust the temperature of the system as appropriate as a frozen sample reaches a target temperature.

In some embodiments, the heater plates can be segmented, contoured, include projections, made of different materials, or have a combination of such characteristics. Variation in the structure of the heater plates can provide for intentionally uneven or regional control of sections of the heater plates during a thawing process.

In some embodiments, the heater plates can include one or more temperature sensors that are thermally isolated from the heater plate material, but are positioned to contact with the exterior surface of a sample vessel received within the heater assembly, such that the temperature of the sample vessel at the surface can be ascertained and tracked over time. In various embodiments, the vessel sensor can be a thermocouple, a thermistor, a resistance temperature detector (RTD), or a non-contact infrared sensor.

Storage at cryogenic temperatures in the range of −150° C. to −196° C. is a commonly applied method for preserving live cell suspensions indefinitely. Within this temperature range, single cells and even multicellular organisms may be safely preserved, and later returned to a biologically active state by the application of proper thawing techniques. Subject to the damage imposed on cellular membranes and organelles by the formation of intracellular ice crystals, a transition through the frozen state would be catastrophic for most eukaryotic cell types. While some specialized organisms have evolved the means of preparative conditioning and are adapted to withstand a transition through a frozen state, mammalian cells are notably susceptible to freezing injury with cellular death being the universal outcome. Nevertheless, when single cells or small multicellular assemblies of cells are properly prepared, survival of the frozen state is not only possible, but quite commonplace. Such conditioning typically involves suspension of the cells in a cryopreservative solution of which there are a variety of formulations, however common to most is the inclusion of an organic solvent that interferes with ice crystal formation, buffers, and salt solutions that dehydrate the cells during the freezing process, thereby minimizing the presence and extent of crystallized water inside the cell. As the dehydration of the cells during the freezing process can be critical to the ultimate viability following a freeze-thaw cycle, the rate of cell freezing must be controlled to allow time for increasingly concentrated salt solutes to properly draw water from the cells as the freezing progresses.

In the same way that freezing rate is critical to the proper preparation of frozen cell suspensions, the thawing rate can directly influence the viability of cryogenically preserved cells. During the transition from cryogenic temperatures to the liquidus temperature, there is encountered a range of temperature, roughly from −50° C. to 0° C., wherein molecular movement is suppressed, but nevertheless extant, and within this temperature range, minute ice crystals may migrate and reform into larger molecular structures that have an increased potential for cellular damage. It is therefore desirable that the transit time through this temperature range be as brief as possible such that the opportunity for ice crystal reformation is minimized. A typical target for the applied rate for the return of frozen cells to the thawed state is "as fast as possible".

Although there are a variety of parameters to weigh in the selection of the ideal storage vessel for frozen cells, the thaw rate is typically a prime consideration. For volumes of cells in the range of 10 mL to 500 mL, cryobag vessels are commonly selected. In various embodiments, the present thawing device can accommodate and thaw the contents of cryobags having volumes of 25 ml, 50 ml, 250 ml, 500 ml, 750 ml, 1000 ml, or 2000 ml. It is appreciated that for cryopreservation, such bag-format vessels are generally not filled to capacity.

As an example (without limitation), when a cryobag that has been equilibrated to a low temperature of −77° C., is inserted into a heater plate assembly that has been equilibrated to a higher temperature of 45° C., a process of thermal energy redistribution will commence that will eventually bring the combined masses to a common temperature. If the temperature of the heater plate assembly is actively maintained, for example at 45° C., then the temperature of the combined masses will equilibrate at a temperature of 45° C. over time. The thermal energy redistribution pattern may be considered to be a migration or flow of thermal energy in an inward direction from the heater plates toward the central plane of the combined mass.

Bag-format storage vessels present some challenges in that the volume of fluid that can be stored comes at a cost of mechanical stability and material wall thinness, which can lead to a vulnerability to impact fracture when at cryogenic temperatures. Further, there lies an additional source of resistance in the thermal pathway of such systems in the form of the heat source-vessel interface. Because a gap of any size, however small, introduces a thermal resistance to the pathway, the elimination or reduction of any gaps will improve the efficiency of the thermal energy transfer. As any bag holding a material as it freezes will have at least some variations in the setting and shape of the bag, there will be small scale (air gap) imperfections at the mating surface that are impossible to eliminate between the cryobag vessel and heater plates. A solution in the context of the present heater plate assembly is to control the rate of thawing such that the cryobag conforms to the surfaces of the heather plates relatively soon after a thawing cycle begins, while still accounting for and minimizing ice crystal formation during the thawing process. Gaps will remain between the exterior of the sample vessel and the heater plates for too long a period of time if some amount of force is not applied to induce the heater plates to flatten out the bag-format vessel. Without adequate application of force, the thermal conductivity of the heat source-vessel interface will not be optimized and therefore the rate of thermal energy transfer for a given temperature differential between the heat source and vessel will not be accurately calculated.

Conversely, bag-format storage vessels present some advantages for fluid storage. Cryobag vessels are typically constructed from materials that are generally puncture-resistant and heat-sealable. Cryobag vessels can be efficiently stored, since they are frozen flat in cassettes that can be stored like books on a shelf. A particular advantage that the present thawing device leverages is that the thermal path to the core midline of the vessel is almost always at maximum about 0.2 inches, which combined with the large relative surface area to volume ratio, allows the cryobag contents to be thawed quickly. Further, and critically for experimental purposes, cryobag vessels are generally free of chemicals that may leach into the fluid and/or frozen contents of the vessel.

For some cryobag vessels, thermal redistribution may not equilibrate the volume of fluid at a rate sufficient or ideal for maintaining the integrity of cells within the sample. Accordingly, in some aspects, physical agitation can be applied to the cryobag vessel via an internal module to ensure that the complete volume of sample is thawed and reaches a target temperature within a target time range. The target time range for thawing any given sample can depend on the size of the cryobag vessel, the starting temperature of the sample, the volume of sample fluid within the cryobag vessel, the heat capacity of the contents of the cryobag vessel, and the characteristics of the contents within the cryobag vessel (e.g., the type of cells, the amount of cryopreservatives or solutes added to the sample fluid, the density of cells within the volume of fluid, etc.).

In some aspects, the cryobag can be labeled with a machine-readable optical label that contains information about the item to which it is attached. This label can be a barcode, a QR Code™, or the like, to identify the contents of the sample held within a cryobag. Accordingly, the thawing system can include a visual sensor to read such codes and thereby identify the sample contents of the cryobag, with that data then being used to calculate a corresponding thawing time for the cryobag.

FIG. 1A illustrates the exterior surfaces of the thawing unit 100. The thawing unit 100 is enclosed in a molded shell formed of an upper shell 105 that mates with a lower shell 110, meeting at a seam 130 on both lateral sides of the instrument. A front panel 115 attached to an interior drawer structure covers the front face of the instrument, while a back panel 135 covers the rear of the instrument. In some aspects, the front panel 115 can be divided horizontally (across the width of the front panel 115) such that a portion of the drawer face is directly attached to and movable with an interior drawer structure. In some embodiments, a fingertip recess 120 in the lower shell 110 is provided to allow manual advancement of the interior drawer if needed; for example, in the event of power loss to the instrument.

In various aspects, the upper shell 105 and the lower shell 110 can each individually be formed of plastic, a synthetic or polymer material, a ceramic, a metal or combinations thereof. The thawing unit 100 can have an upper shell 105 and a lower shell 110 formed of the same or different materials. In some aspects, the upper shell 105 and the lower shell 110 can each be formed of a synthetic plastic, and can further have cosmetic features such as a specific color, texture, or other such ornamentation. In some aspects, the upper shell 105 and the lower shell 110 can mechanically couple with each other by means of frictional or snapping features, or by screw fasteners.

In some embodiments, the upper shell 105 include a touchscreen interface 140 that is positioned in a fixed-angle cowl 125. In other embodiments, the cowl 125 with the touchscreen interface 140 can be an independent and/or severable container that can be attached to the upper shell 105 by a hinge structure. In some aspects, the hinge structure can restrict movement of the touchscreen interface 140 to a single axis, while in other aspects, a multiple axis hinge assembly can be provided to allow complex positioning of the touchscreen interface 140. The touchscreen interface 140 can be electronically connected to a driver circuit board positioned within the cowl 125 or elsewhere as part of the upper shell 105. The upper shell can also include an access port 145 (e.g., a USB serial port jack) within the cowl 125 to allow access to external communications or storage media.

In some aspects, the upper shell 105 and/or the front panel 115 can be a formed of clear material (e.g., plastic) which an operator can view the action of the heating assembly and the progress of the cryobag vessel thawing process. The clear material can be a synthetic material such as a polymer or clear plastic, or of glass or another clear material. In such aspects, a light source (e.g., an LED) or a camera can be placed proximate to the interior heating assembly.

In yet other embodiments, the instrument can be formed without a touchscreen panel. The instrument can alternatively include control features, such as buttons or switches, on the exterior of either the upper shell 105 or the lower shell 110, or both, for setting the time, temperature, and other aspects related to operating the instrument.

Figure 1B:
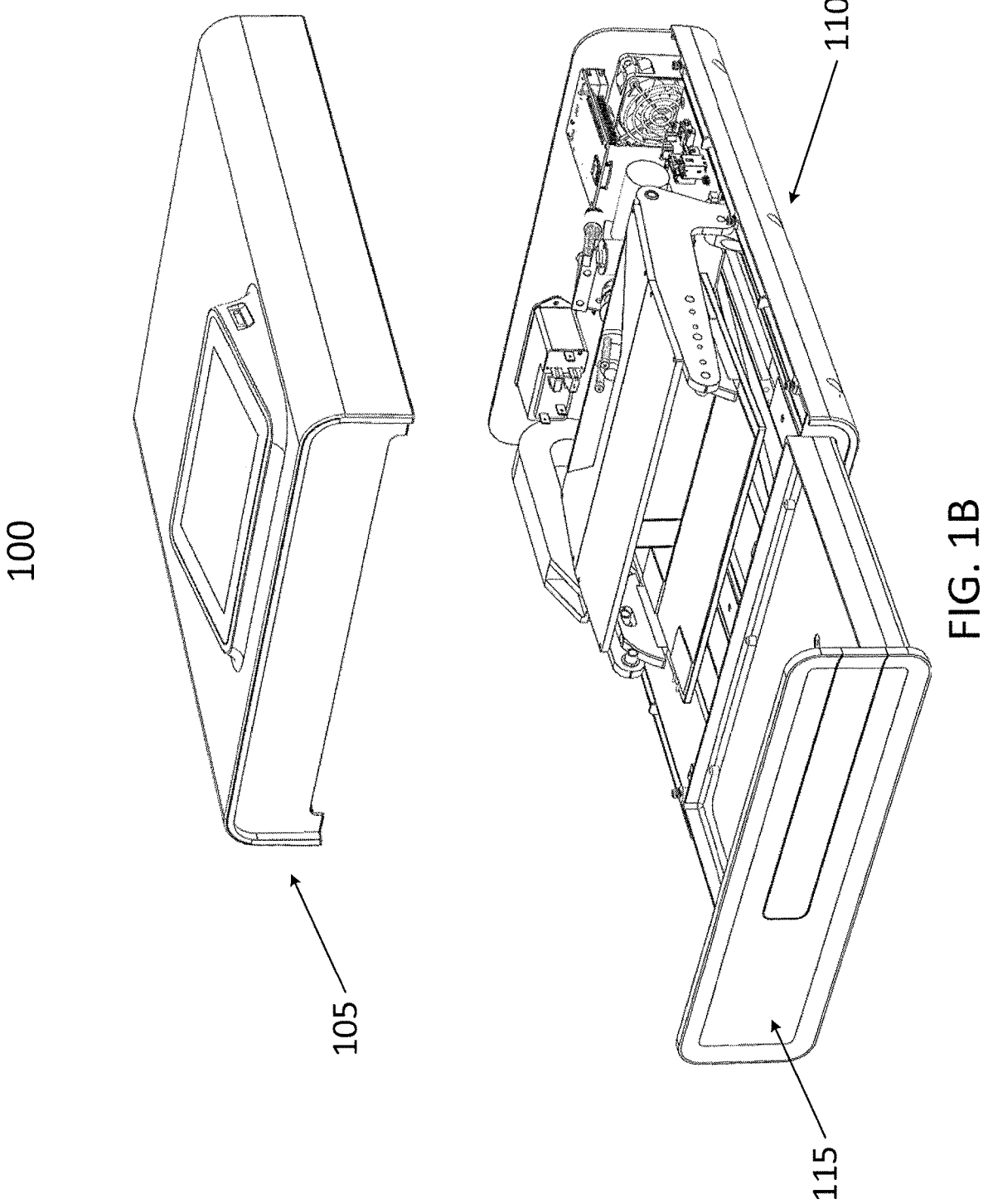
FIG. 1B illustrates the sample thawing apparatus shown in FIG. 1A, with a sample drawer extended and with a top shell removed above the lower shell and internal components.

FIG. 1B illustrates the sample thawing apparatus shown in FIG. 1A, with the sample drawer and front panel 115 extended in an open position, available to receive a sample bag or to have a sample bag removed. The upper shell 105 is shown elevated above the lower shell 110 and internal components (discussed in further detail below).

Figure 2:
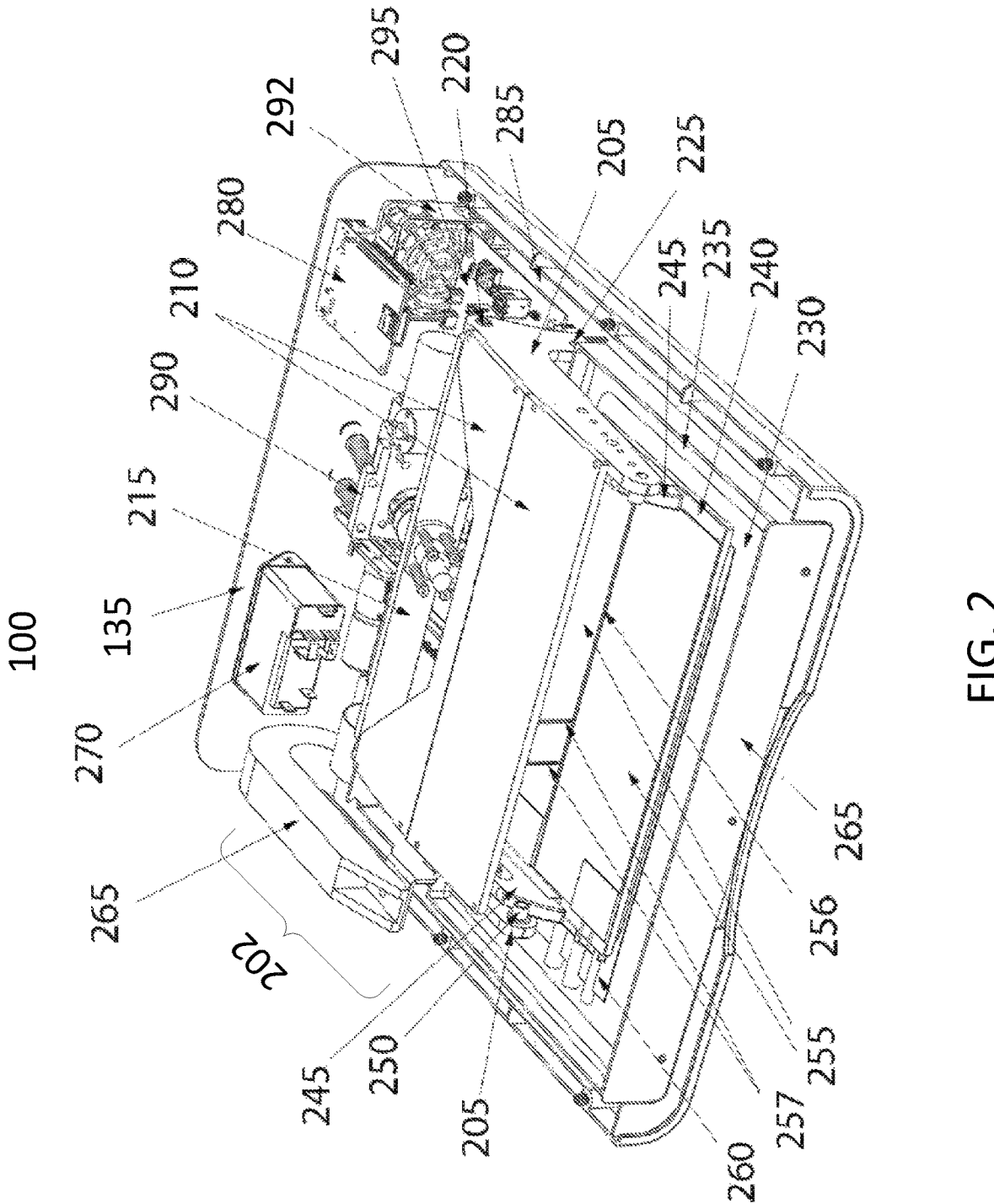
FIG. 2 illustrates a perspective view of the sample thawing apparatus shown in FIG. 1A, where the top of the shell exterior has been removed, according to various embodiments.

FIG. 2 illustrates internal components of the thawing unit 100, specifically showing thawing unit 100 as in FIG. 1A with the upper shell 105, touch screen cowl 125, touchscreen interface 140, and front panel 115 removed. Upper heater plate 240 is shown, which can be formed of a material with a generally high thermal conductivity such as, but not limited to, aluminum, aluminum alloys, copper, copper alloys, stainless steel, carbon fiber, graphene materials, and the like. In such aspects, upper heater plate 240 can have a thermal conductivity of from twelve to four hundred Watts per meter-Kelvin ($\kappa$=12-400 W/(m·K)), or at increments or gradients of conductivity within that range. Bonded to the upper surface of the upper heater plate 240 are two or more heaters 255. In some aspects, heaters 255 can resistance heaters, such as flexible silicone mat heaters. In other aspects, heaters 255 can cover a majority of the surface area of the upper surface of the heater plate 240. In some embodiments, two heaters 255 are separated by a gap 256 that allows for the passage or placement of one or more thermistors 257 therebetween. The one or more thermistors 257 can be embedded in the heater plate 240 to monitor the temperature of the upper heater plate 240, and can provide thermal measurement information to a control unit such that the temperature may be controlled by a feedback circuit of the control unit, which regulates the energy applied to the two heaters 255. In some embodiments the heaters 255 on or in the upper heater plate 240 can operate on independent control circuits so that the thermal input to the heater plate can be actively regulated (manually by operator input or automatically by algorithm) to balance the temperature of localized regions of the upper heater plate 240 in response to uneven thermal sinks that may be in contact with the upper heater plate 240. In some embodiments the number of individual heaters 255 on the upper plate may be greater than two in order to apply greater regional control of the temperature of the upper heater plate 240, providing for more precise control and dynamic balancing of heat input to the plate, to such that the thawing unit can accept and evenly thaw bag-format vessels across a large range of sizes or volumes.

In some aspects, heaters 255 can be individually controlled as subsets based on the location of the heaters 255 on the upper surface of the upper heater plate 240. For example, the heaters 255 positioned toward the front of the upper heater plate 240 can be regulated at a different temperature than heaters positioned toward the rear of the upper heater plate 240. Alternatively or in combination, the heaters 255 positioned toward the left side of the upper heater plate 240 can be regulated at a different temperature than heaters positioned toward the right side of the upper heater plate 240. In further aspects the heaters 255 can be thermally insulated from each other on the surface of the upper heater plate 240, and/or from the rest of the thawing device.

The heater plate 240 is attached to the cantilever assembly 202 by two concentric ring surface bearings that interface with three flanged dry bearings 250 rotating on shafts embedded into each of the two cantilever arms 205. The cantilever assembly 202 can be considered as a cantilevered clamp mechanism formed by two cantilever arms 205, cross-plates 210, and a push bar 215. Circular bearing races 245 restrict the motion of the heater plate 240 to a rotation around an axis that is coincident with the intersection of a horizontal plane through the middle of the cryobag and a front vertical plane through the midline of the cryobag. The two cantilever arms 205 are joined by two cross-plates 210 that stiffen the cantilever assembly and prevent distortion of the assembly under uneven clamping loads. The cantilever arms 205 rotate on two pivots 225 that join with two bearing blocks (seen in FIG. 3 below) that are also attached to the base plate 285. The cantilever assembly 202 as a whole is articulated by the push bar 215 that attaches to both cantilever arms 205 through two pivot bearings 220. The push bar 215 is articulated by forces produced by a screw-jack mechanism 290.

A model of a standard cryogenic storage bag is shown as vessel 260 clamped between the upper heater plate 240 and the lower heater plate 230. The lower heater plate 230 rests in a frame receiver 235, where the frame receiver 235 is a part of and is movable along with the extensible drawer 265. The lower heater plate 230 can be formed of the same or different materials, with corresponding thermal conductivity, as described with regard to upper heater plate 240. Upon release of the clamping pressure produced by the screw-jack mechanism 290 and raising of the cantilever assembly 202 and attached upper heater plate 240, the drawer 265 (and vessel 260 placed therein) is free to be extended forward from the remainder of the instrument on roller-bearing slides (seen in FIG. 6A below). The advance and retraction of the drawer 265 allows for any appropriate storage bag (here represented by vessel 260) to be introduced into and removed from the instrument.

Further shown is a graphics control circuit board 280 that attaches to the upper shell, which includes a distinct non-transitory computer-readable medium, that can be electronically connected to the touchscreen interface 140 and/or the access port 145. A peripheral circuit board 295 which also includes a distinct non-transitory computer-readable medium, includes a microcontroller that governs the mechanical and electrical power components of the instrument. The thawing unit 100 can further include a power cord and power switch interface module 270, a cooling fan 292, and a wiring link-chain harness 265 (shown as a volume-filling primitive element).

Figure 3:
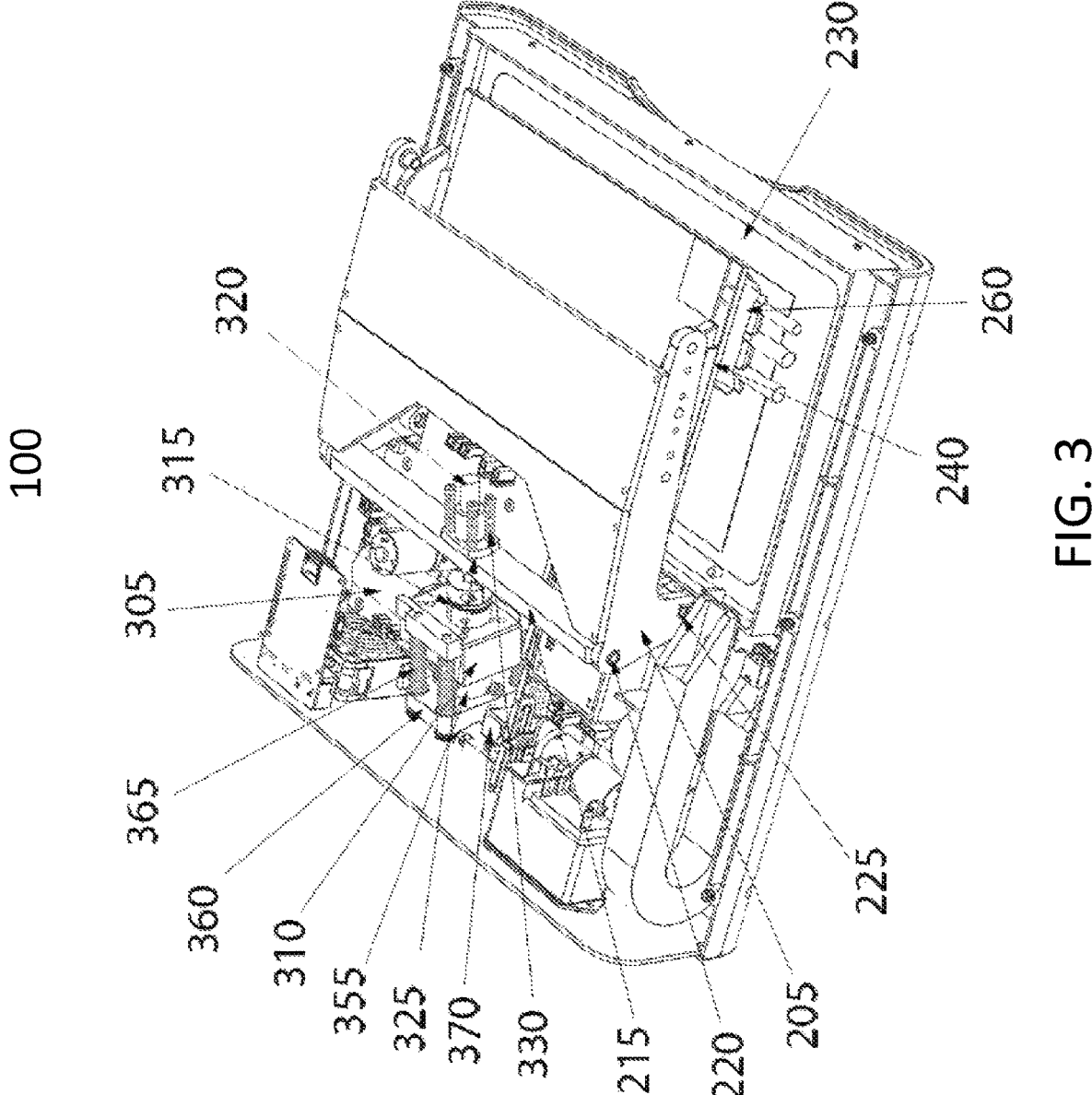
FIG. 3 illustrates a view of the sample thawing apparatus shown in FIG. 2 from an upper-left viewpoint, according to various embodiments.

FIG. 3 illustrates internal components of the thawing unit 100, specifically showing thawing unit 100 as in FIG. 2, from a perspective focusing on components of the screw-jack mechanism 290. Shown is the screw drive motor 305 that drives a worm-gear mechanism 310, where the shaft of the motor is joined by a coupler 315 that in turn joins to a screw shaft 320. The screw shaft 320 interfaces to a threaded flanged sleeve 325 that is attached to the push bar 215 through four spring-loaded screws 330. Depending upon the direction of the rotation of the thread screw 320, the cantilevered arms 205 clamp or release objects situated between the upper heater plate 240 and the lower heater plate 230. A load cell 355 is positioned between the motor 305 and the support base 360 of the screw-jack assembly 290. Under no-load conditions, the pressure of the worm-gear mechanism 310 on the load cell 355 is neutralized by four springs 365 compressed between the worm-gear housing 310 and the support base 360. In some aspects, the support base 360 can be attached to the instrument base plate 285 through pivot bushings embedded in the bearing blocks 370 that are attached directly to the base plate 285. In other aspects, the bearing blocks 370 can be attached to the base plate 285 through intermediary mounting structures.

It should be appreciated that thermal conductivity ($\kappa$) of the interface between both the upper heater plate 240 and the lower heater plate 230 on the exterior surface of the vessel 260 can be partially dependent on the pressure applied to the interface. Thus, the engagement and the disengagement of the clamping cantilever assembly 202 as driven by the screw-jack assembly 290 provides for a degree of control of the rate of thermal energy transfer from the heater plates into the cryobag vessel 260. Accordingly, through control of the cantilever assembly 202 and the screw-jack assembly 290, upper heater plate 240 and the lower heater plate 230 can apply pressure onto the cryobag vessel 260 with a selectable amount of compressive force. The precise control of the thermal energy transfer from the upper heater plate 240 and the lower heater plate 230 to the cryobag vessel 260 resulting from the uniform force applied through the clamping cantilever assembly 202 to the interface of the heater plates with the exterior surface of the vessel 260 allows the rate of thermal energy transfer, and therefore the thawing end-point time, to be a calculable value. Upon the determination of the thawing end-point time, the release of the vessel 260 from the clamping cantilever assembly 202 can be achieved by releasing or drawing-back pressure from the screw-jack assembly 290, which can be controlled by the feedback circuit of the control unit. Once the force of the screw-jack assembly 290 is released, and the upper heater plate 240 has disengaged from applying pressure on the vessel 260, the drawer can be unlatched and opened, and the vessel 260 can be removed.

Figure 4:
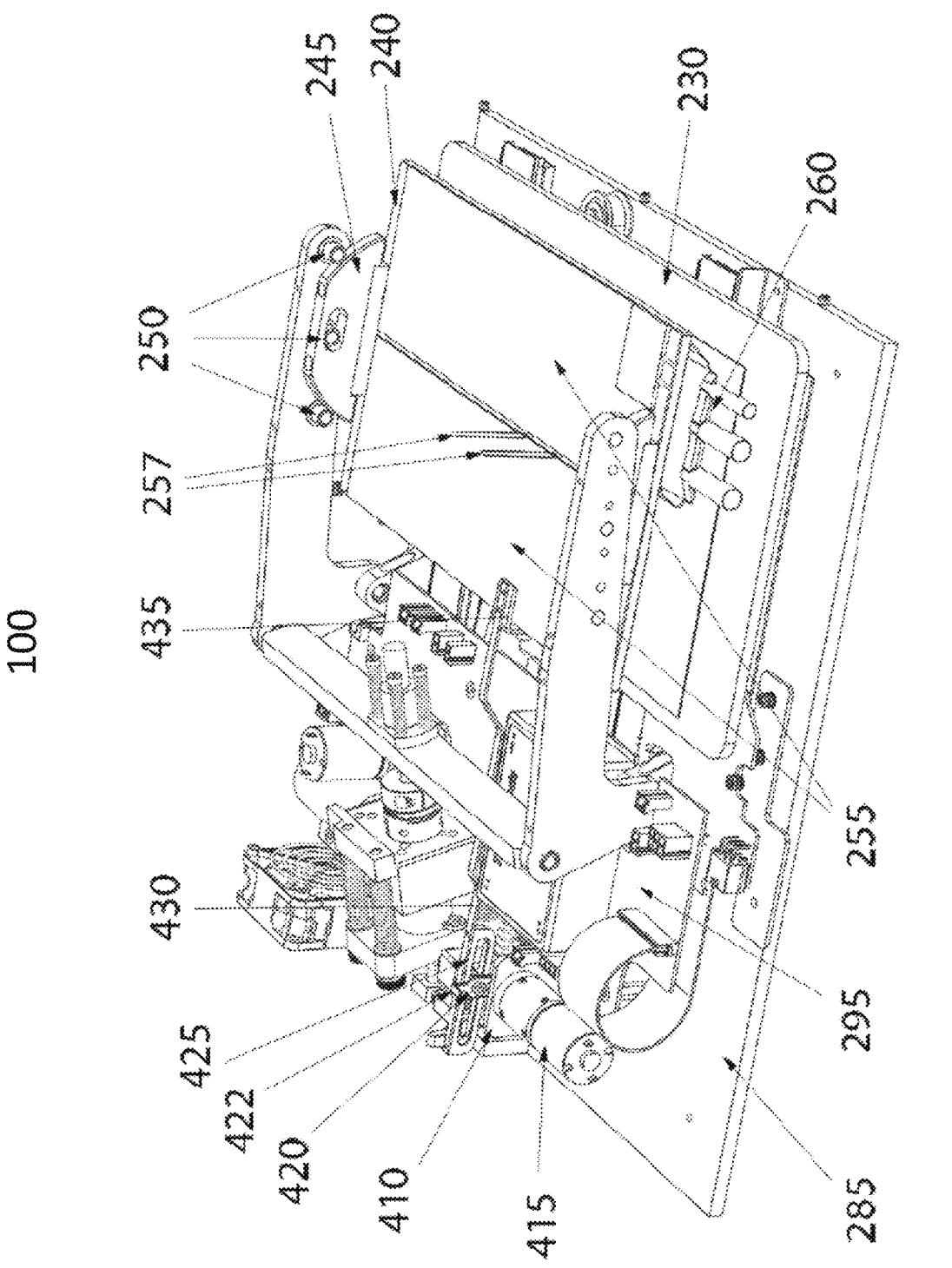
FIG. 4 illustrates the same perspective viewpoint shown in FIG. 3 with additional parts of the apparatus selectively removed to reveal specific parts and assemblies of the invention, according to various embodiments.

FIG. 4 illustrates internal components of the thawing unit 100, specifically showing components of the rocking mechanism for the upper heater plate 240. A rocker gear motor 415 is mounted to the base plate 285 by a mounting bracket 410. Attached to the gear motor 415 shaft is an eccentric crank 420 that drives the linear bearing block 425 in a vertical oscillation, where the bearing block 425 moves up and down in response to the rotation of the crank 420. The bearing block 425 is mounted to the spring lever arm 430 that terminates at, and is mechanically attached to, an angle mount bracket 435. The angle mount bracket 435 is in-turn attached to the upper heater plate 240. Raising and lowering the spring lever arm 430 induces a rocking motion in the upper heater plate 240 that can function to mix the liquid contents of the vessel 260 held by the instrument. At the beginning of a thawing sequence, the vessel 260 contents are likely in a solid state, and as such, when being clamped between the plates 240 and 230, the upper heater plate 230 will be restricted in motion due to the vessel rigidity, and will not be able to rock until the cryobag vessel 260 contents acquire some degree of plasticity from partial melting induced by an increase in temperature. Therefore, the spring action of the lever arm 430 allows the rotational motion of the crank 420 to continue while the rocking motion of the heater plate is restricted. Attached to the end of the eccentric crank 420 arm is a flag 422 that can activate an optical gate mounted on the peripheral circuit board 295. The optical gate signal triggered by the flag 422 can stop the gear motor at an appropriate rotation angle, ensuring that the upper heater plate 240 is at the appropriate or necessary angle such that when the cantilever assembly 202 is raised, the rear edge of the upper heater plate 240 does not interfere or physically conflict with the motion drawer 265 upon forward extension of the drawer assembly.

In various aspects, the gear motor 415 can be configured to oscillate the upper heater plate 240 at a frequency of from 20 to 120 cycles per minute, or at increments or gradients of speed within that range. In other aspects, the gear motor 415 can be configured to oscillate the upper heater plate 240 at a frequency less than 20 cycles per minute or at a frequency greater than 120 cycles per minute.

During the sample thawing process the rocking motion will introduce a mixing oscillation in the vessel payload, thereby increasing thermal convection and reducing thermal gradients within the sample fluid, having a net effect of (1) decreasing the overall thaw time and (2) suppression of regions of higher temperature that may, in some situations, be deleterious to cell viability. The fluid mixing is also helpful in homogenizing and diluting regions of concentrated salt solution that are imposed by the freezing process.

In several embodiments, the surfaces of the upper heater plate 240 and lower heater plate 230 that interface with the vessel 260 are bare, flat, metal or alloy plates. With many, if not most typical cryopreservative solutions the salts and buffer solutes that freeze tend to reverse the process when warming, with the highest salt concentration eutectic material in the interstitial spaces of the pure water crystals melting first, and this loosens the structure of the frozen material before melting of the more pure water crystals occurs. In other words, as the sample material thaws it becomes slushy. Accordingly, when under a clamping pressure as described herein, the vessel surface may initially have irregularities and high points of contact, but the shape of the vessel tends to quickly level out and give excellent thermal contact.

Once there is compliant contact between bare heater plates and the surface of the vessel, there is no thermal resistor in between those surfaces (e.g., silicone or putty), and heat can be quickly introduced into the bag vessel system. In such aspects, the bag itself can be considered the pliable material conforming the fluid to thaw with the heater plates. In such aspects, some clamping pressure by the heater plates on the vessel is needed. In an exemplary system, for a nine by five inch bag (9"×5" in.) bag with forty-five square inches of area (45" in.$^2$), about ten to twenty pounds (10-20 lbs.) of compression is needed, which works out to be around 0.2 to 0.4 PSI. With pressure concentrated on a couple of initial contact points, and with the ability to apply significantly more pressure, shape compliance of the vessel to the heater plates happens fairly quickly during the thawing process.

Generally, the thawing unit 100 will be powered, such that opening and closing of the thawing unit 100 lid and drawer will be driven by the drawer drive gear motor 605, and such that raising and lowering of the cantilever assembly 202 by the screw-jack assembly 290 will be driven by the worm-gear motor 305. During emergency events such as a local power failure, the recovery of the vessel contained within the unpowered instrument may be necessary. As the thawing unit 100 relies on a clamping pressure to provide efficient thermal conduction, a power failure during a clamped state will require the upper heater plate 240 cantilever assembly 202 to be raised prior to opening the drawer 265 of the instrument for vessel removal. Accordingly, some embodiments of the invention comprise a cantilever release mechanism.

Figure 5:
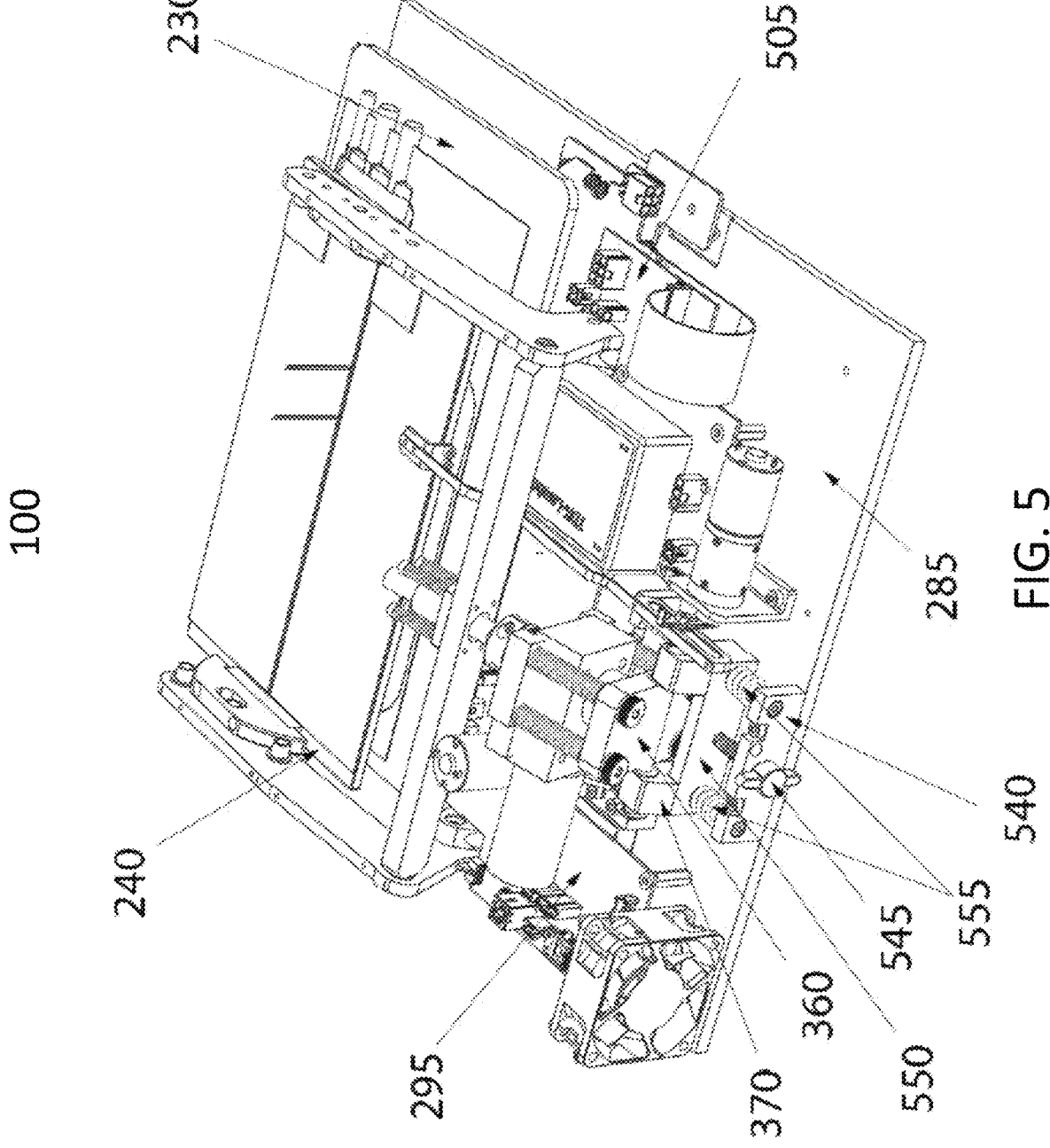
FIG. 5 illustrates a more rearward view of the subsets of the apparatus shown in FIG. 4.

FIG. 5 illustrates internal components of the thawing unit 100, specifically focusing on the emergency cantilever release mechanism. In one embodiment of a mechanical release, the screw-jack assembly 290 base plate 360 pivots in bushings embedded in the bearing blocks 370, where the bearing blocks 370 are mounted in a rail-sled 550 that slides on two rails 555 mounted in end blocks 540, where the end blocks 540 are in-turn mounted to the base plate 285. The rail-sled 550 is held in a forward position by a set screw 545, which as shown is a right-hand set screw. By rotating the set screw 545 in a counter-clockwise motion, the rail-sled 550 will be retracted toward the rear of the instrument, thereby relieving clamping pressure between the upper heater plate 240 and the lower heater plate 230. Further counter-clockwise rotation of the set screw 545 will then raise the upper heater plate 240 cantilever assembly 202, thereby raising the upper heater plate 240 to allow forward motion of the drawer assembly 265 in which the lower heater plate 230 is mounted. Either prior to or following the restoration of power to the instrument, the set screw 545 can be turned clockwise to forward advance the rail-sled 550 to a forward stop position to restore full normal functionality to the instrument.

In other embodiments, the thawing apparatus can include a failsafe or safety structure in the case of cryobag vessel breakage. For example, the lower heater plate can include grooves or barriers to direct and collect thawing fluid from a broken or unsealed vessel. In some aspects, the lower heater plate and/or the upper heater plate can have features for positioning the cryobag vessel to ensure that any unintended fluid leakage is correctly directed to catch and disposal systems. In other alternative embodiments, a cryobag can be held within a secondary containment bag, such that any leak or structural failure of the cryobag will contain fluid within the secondary containment bag.

Figure 6A:
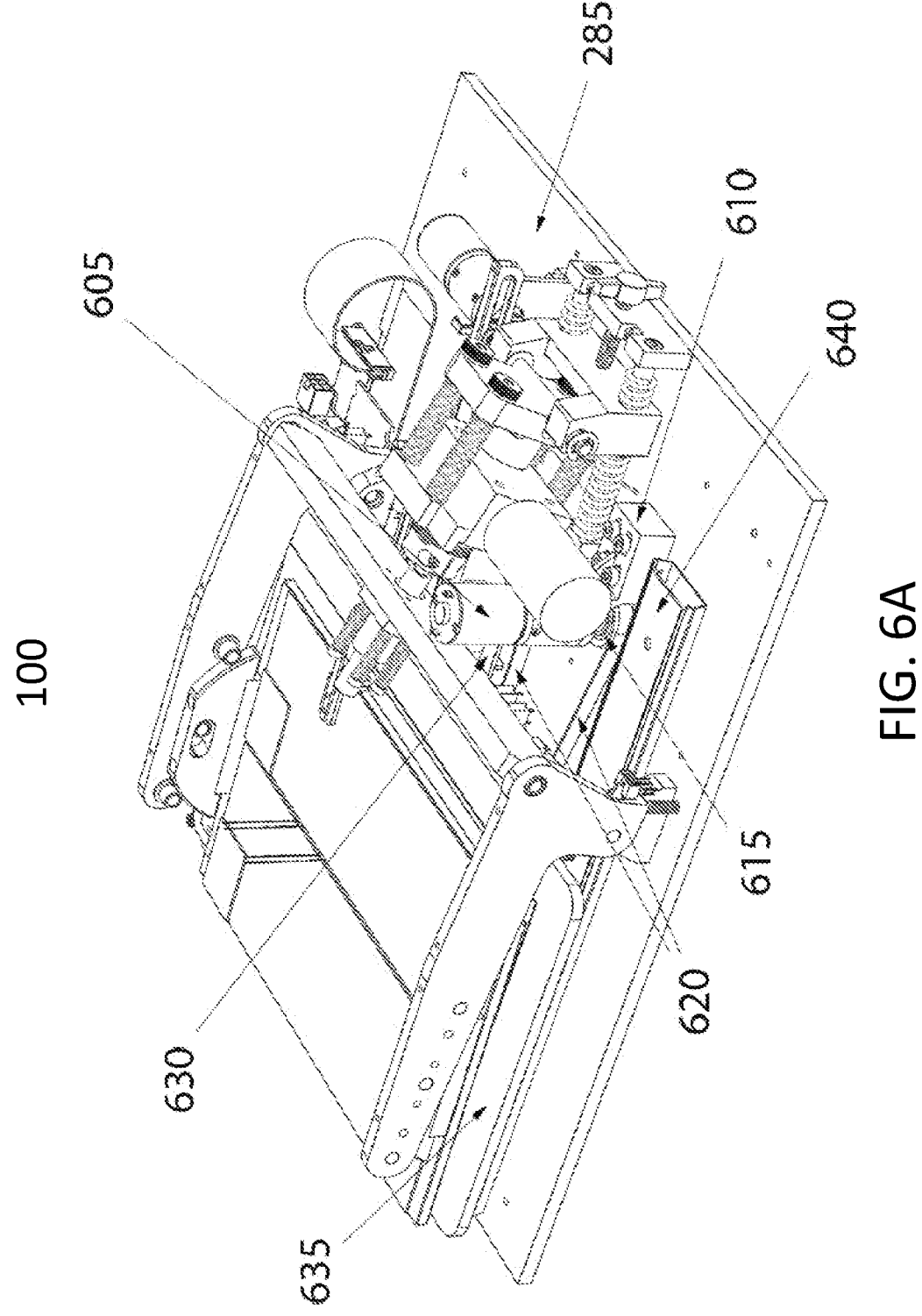
FIG. 6A illustrates an upper left-rear view of the apparatus shown in FIG. 5 with additional parts of the apparatus selectively removed to reveal specific parts and assemblies of the invention, according to various embodiments.
Figure 6B:
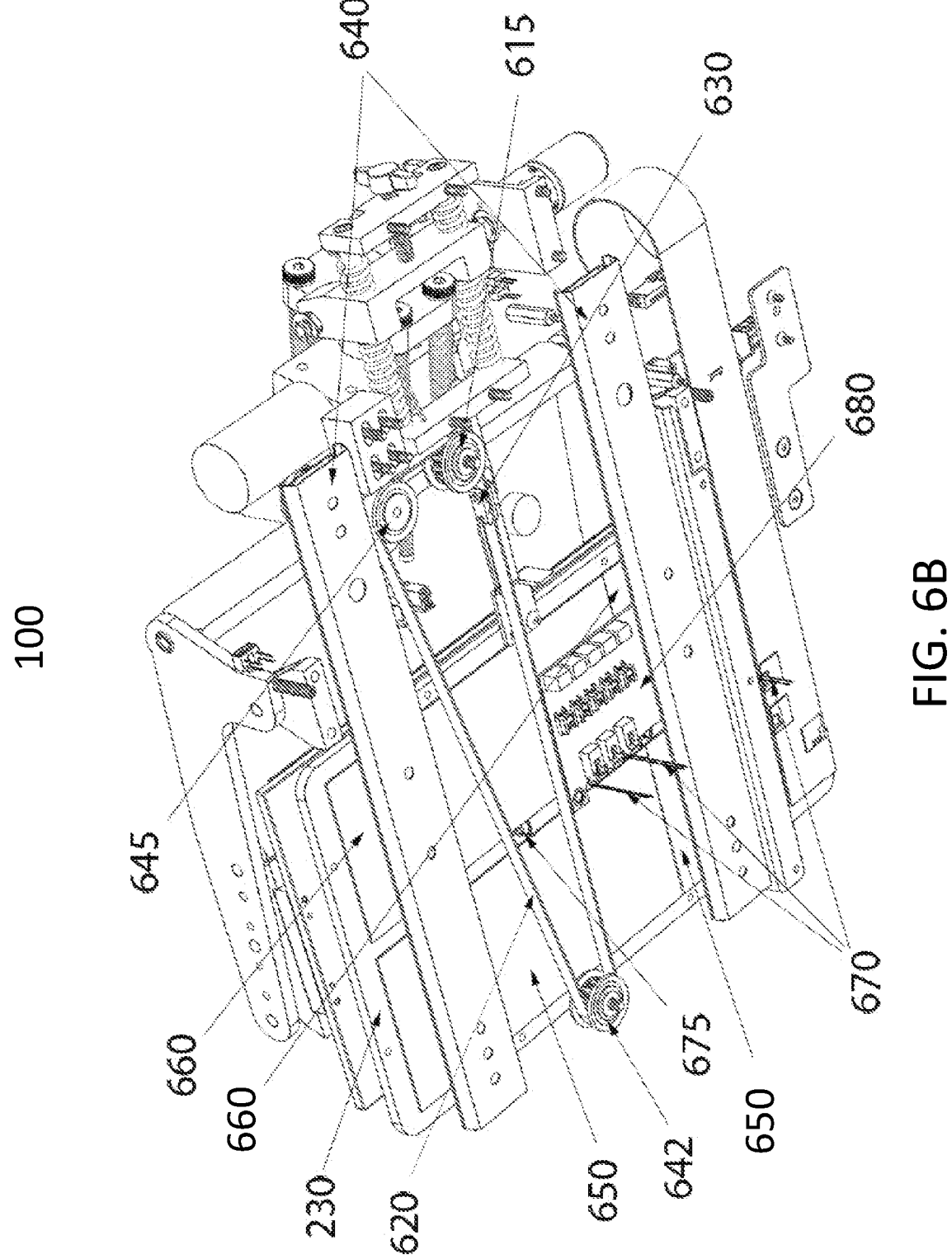
FIG. 6B illustrates a lower left-rear view of the apparatus shown in FIG. 5 with additional parts of the apparatus selectively removed to reveal specific parts and assemblies of the invention, according to various embodiments.

FIG. 6A illustrates internal components of the thawing unit 100, focusing on the structure of the drawer movement mechanism. FIG. 6B illustrates an underside view of the instrument sub-assemblies shown in FIG. 6A, with the base plate 285 removed from view. The drawer drive gear motor 605 is attached to the base plate 285 through the mounting frame 610. A timing belt pulley 615 is attached to the shaft of the drawer drive gear motor 605, and a timing belt 620 is looped around the timing pulley 615, an idler pulley 642, and a tensioning pulley 645. The timing belt 620 is attached to a linkage bracket 630 that is also attached to the drawer (not shown here) such that rotation of the timing pulley 615 will advance and retract the drawer. The drawer cradles the lower heating plate 635, and the drawer is also fixed to two bearing slides 640 that allow full extension of the drawer.

In FIG. 6B, the complete circuit of the timing belt 620, the linkage bracket 630, the timing pulley 615, the idler pulley 642, and the tensioning pulley 645 are visible, as well as both bearing slides 640. Also visible is the underside of the lower heater plate 230. Shown as affixed to the underside of the lower heater plate 230 are two sets of mat heaters, forward set heaters 650 and rear set heaters 660 (with forward and rear being defined in reference to the direction the drawer 265 moves and is accessed). Each set of the forward set heaters 650 and rear set heaters 660 have two heaters. In other embodiments, either forward set heaters 650 and rear set heaters 660, or both, can include more than two heaters. The number of heaters for the forward set heaters 650 and rear set heaters 660 allowed for more precise and gradated control of heating of the lower heater plate 230. Further, the dual sets of mat heaters allows for the thermal energy input from each heater to be independently regulated so as to balance the lower heater plate 230 temperature under dynamic heat sinking conditions, such as contact with a cold cryostorage vessel.

Also shown are the electrical leads from three temperature sensors 670 that are embedded into the lower heater plate 230. In some aspects, more than three temperature sensors can be used to monitor the various regions of the lower heater plate 230. The underside of one of multiple vessel temperature sensor islands 675 that are embedded into the lower heater plate 230 are visible in this figure. The circuit board 680 that interfaces with the embedded sensors 670, 675, and supplies power to the forward set heaters 650 and rear set heaters 660, is shown mounted to the rear underside of the lower heater plate 230. In other aspects, each of the forward set heaters 650 and rear set heaters 660 can be thermally insulated from each other, and/or from the rest of the thawing device.

Figure 7:
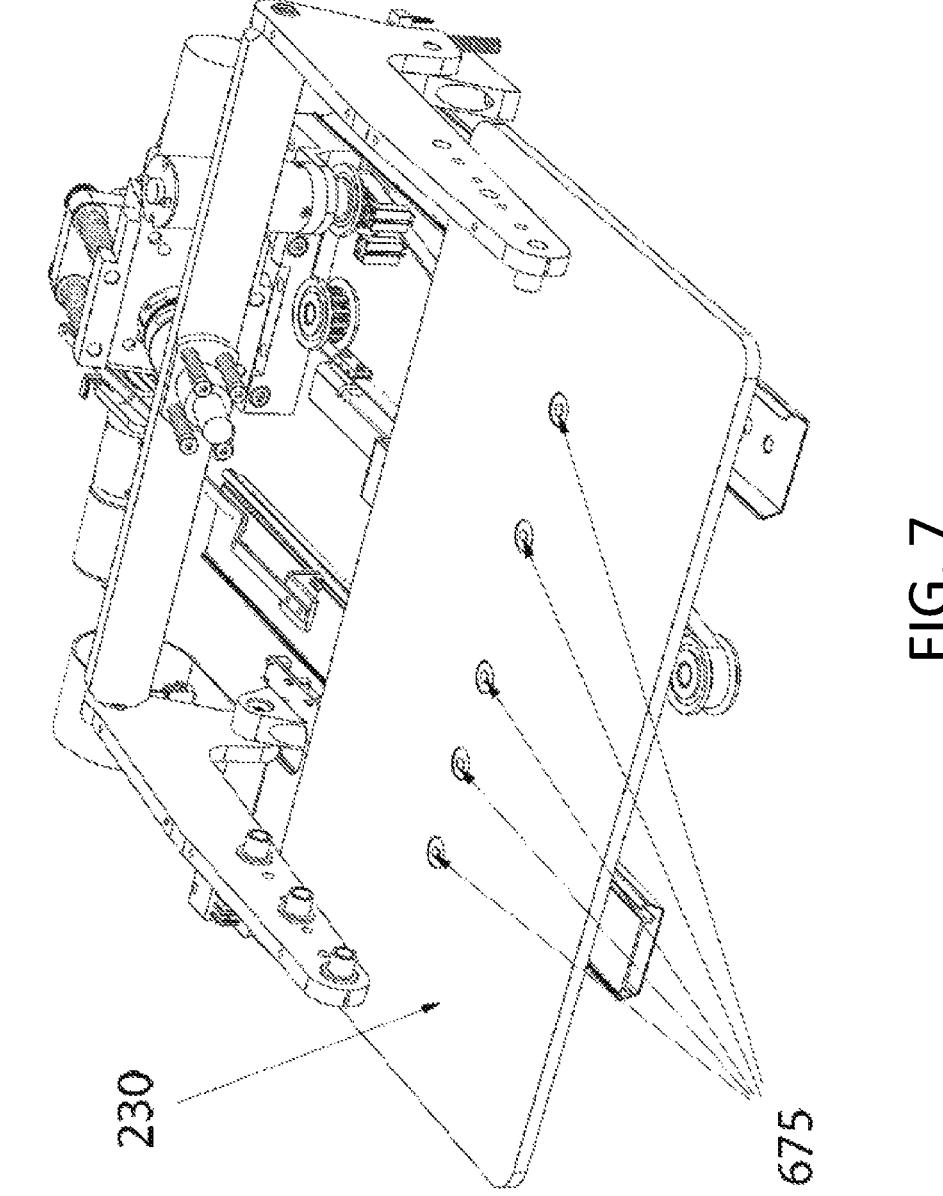
FIG. 7 illustrates an upper front-right view of the apparatus shown in FIG. 6 with additional parts of the apparatus selectively removed to reveal specific parts and assemblies of the invention, according to various embodiments.

FIG. 7 illustrates internal components of the thawing unit 100, focusing on the temperature sensors built into the structure of the lower heater plate 230. In particular, multiple vessel temperature sensor islands 675 are present in and pass through the body of lower heater plate 230, such that the temperature sensor islands 675 can monitor the surface temperature of cryogenic storage vessels that are resting in or clamped onto the surface of the lower heater plate 230. The multiple temperature sensor islands 675 are distributed along a lateral mid-line of the lower heater plate 230. The spacing between the temperature sensor islands 675 is an arrangement that generally provides for contact of two or more temperature sensor islands 675 with standard cryogenic storage bag vessels that represent the majority of the commercially available bag vessel products. In some aspects, for example with a 25 milliliter storage bag that has a relatively smaller surface area, only one of the temperature sensor islands 675 may be in contact with the storage bag. The location of the temperature sensor islands 675 within the lower heater plate 230 as opposed to the upper heater plate 240 has an advantage in that, due to gravity, the vessel contents upon reaching a liquid phase will displace any gas pockets that are present in the vessel interior on the bottom side of the vessel and thereby provide the optimal thermal path between the contents and the temperature sensor islands 675. In other words, any bubbles in the cryobag will rise to the top of the bag, and the bottom of the bag will be substantially flat on the surface of the lower heater plate 230, maximizing contact with the available thermal sensors. Another advantage of installing the sensors in the lower heater plate 230 is that the position of the lower heater plate 230 remains static, while sensors installed in the upper heater plate 240 would undergo oscillation during a portion of the thawing process. Of course, in some embodiments, it is appreciated that thermal sensors positioned in the upper heater plate 240 may provide for alternative advantages, such as targeting specific locations for thermal measurements on particular vessels. In further embodiments, the temperature sensors can be thermocouples, thermistors, IR sensors, or RTD sensors.

Further aspects of the overall sample thawing apparatus can include a communications module, formed of a non-transitory computer-readable medium, and configured to transmit to other devices sample data, including thermal data about a sample vessel held by the thawing device. The communications module can be directly coupled with temperature sensors of the sample thawing apparatus, such as temperature sensor islands 675. The communications module can also be electronically coupled with the graphics control circuit board 280, the peripheral circuit board 295, and touchscreen interface 140, allowing for control of all aspects of the instrument. The communications module can be further configured to communicate with a remote microprocessor (e.g. a cloud-based server or computer) in order to sort and display data. The communications module is also configured to receive instruction data or sample vial identification data, and to control the heating of a sample vial accordingly.

Figure 8:
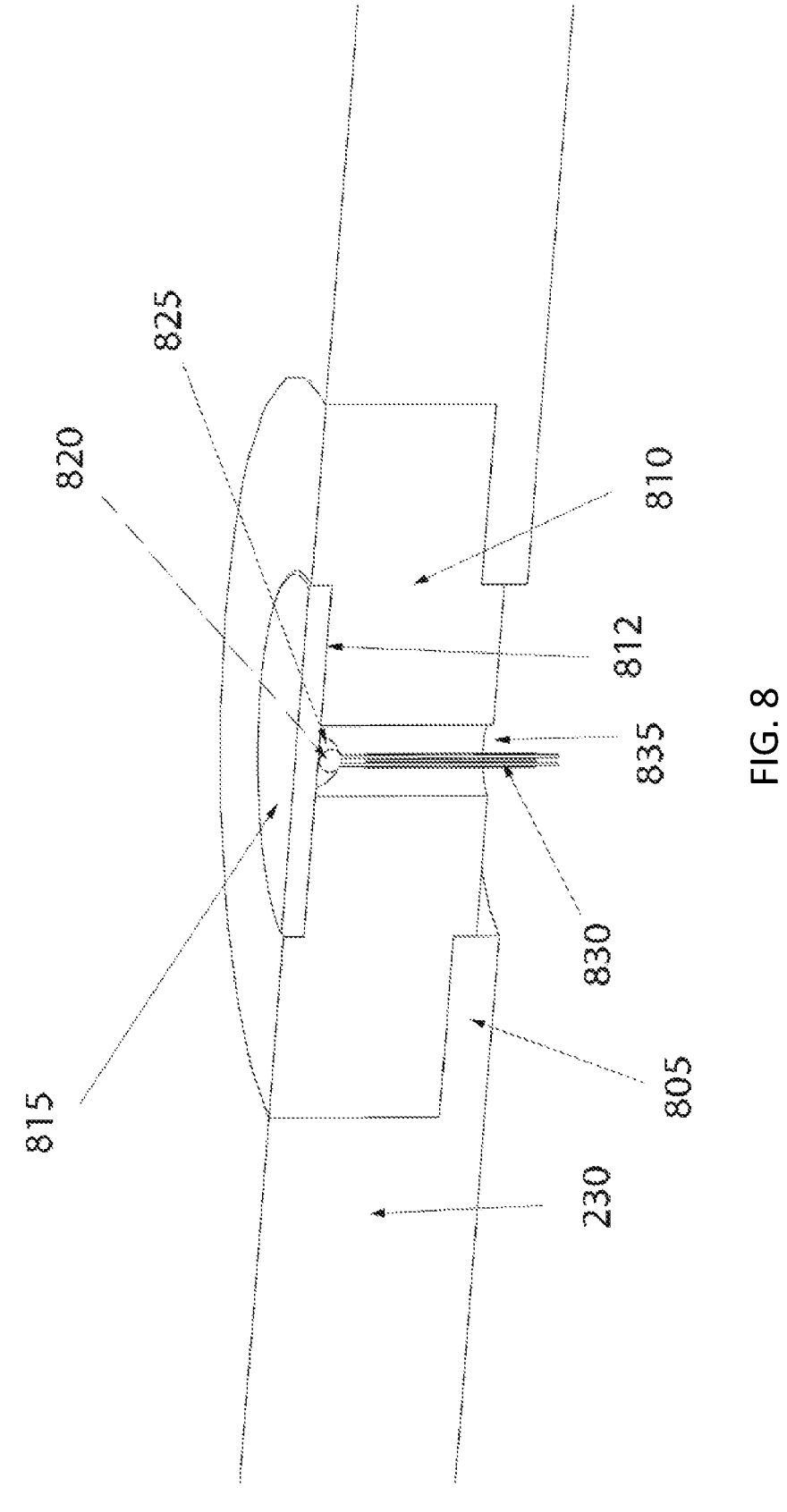
FIG. 8 illustrates a cross-section view of a thermal sensor, according to various embodiments.

FIG. 8 schematically illustrates a cross-section of a lower heater plate sensor 800 (alternatively referred to as "thermal sensors") showing the sub-components of the sensor islands. Resting in a cylindrical recess in the lower heater plate 230 is an insulation disc 810 that is supported by a ring flange 805, which can be an integrated structure of the lower heater plate 230. In some aspects, the insulation disc can be affixed on a thermally conductive material, which in turn is attached to a thermocouple or other temperature sensor structure. In some embodiments, the insulation disc 810 can be constructed from, but not limited to, a semi-rigid foam material that provides a spring-like resistance to downward forces, and can have a thermal conductivity ($\kappa$) in the range of from 0.02 to 0.15 W/(m·K). In various embodiments, the semi-rigid foam material can be a polyethylene foam blend, alternative polymer foams, or laminates of foam materials. The insulation disc 810 includes a recess 812 in the upper surface that receives a contact disc 815 of a thermally conductive material. In some embodiments, the contact disc 815 can be constructed from (but is not restricted to) copper, copper alloys, silver, silver alloys, aluminum or aluminum alloys. In some aspects, the contact disc 815 has a thermal conductivity of greater than one hundred fifty Watts per meter-Kelvin ($\kappa$>150 W/(m·K)). In some embodiments, the contact disc 815 can be plated with a coating such as nickel or gold to prevent corrosion of the contact disc 815. A thermocouple junction 820 is affixed to the underside of the contact disc 815, generally at the center of the contact disc 815. In some aspects, the thermocouple junction 820 can be attached to the contact disc 815 by a solder joint 825. In some embodiments, a resistance temperature detector can be used instead of a thermocouple junction. Thermocouple wire leads 830 exit the underside of the insulation disc 810 through a channel 835. In some aspects, the contact disc 815 can be bonded to the insulation disc 810 by an adhesive joint.

In operation, a frozen cryobag or sample vessel can be considered a thermal sink load. The thermal sink load, being placed upon the lower heater plate 230, comes into contact with the contact disc 815, thereby creating a dynamic heat flux through the sensor system that includes the heater plate 230, the insulation disc 810, the contact disc 815, and the cryobag vessel. It should be understood that each of the one or more thermal sensors (e.g., temperature sensor islands 675) in the lower heater plate 230 can form such a sensor system as seen in FIG. 7, which can be controlled individually or in combination based on the aggregate of sensor data measured. The insulation disc 810 can be formed of a material selected to have the lowest thermal conductivity of the sensor system, and therefore under a condition of an established temperature flux between the lower heater plate 230 and the cryobag vessel, the greatest temperature drop in the thermal pathway will occur across the insulation disc 810. As a result the temperature of the contact disc 815 will be closely coupled to the temperature of the cryobag. In other words, the measurement of temperature will be relatively more specific for a section of the cryobag at the respective thermal sensor within lower heater plate 230.

As the temperature of a frozen cryobag vessel that is placed in contact with the lower heater plate 230 will quickly begin to rise, the temperature differential between the lower heater plate 230 and the cryobag vessel will decrease and the magnitude of the thermal flux through each sensor system will be constantly changing, and may have local variations as measured at each thermal sensor in the lower heater plate 230. As a result, the temperature of the contact disc 815 will not necessarily reach equilibrium with the cryobag vessel, but rather the temperature of the contact disc 815 will become a relative proxy for the temperature of the cryobag vessel in the region of the contact bag and contact disc 815 interface. Because the cryobag vessel increases in temperature, and the temperature differential between the lower heater plate 230 and the cryobag vessel is reduced, the temperature of the sensor contact disc 815 will more closely represent that of the cryobag vessel to a point where, at the near completion of the phase change of the cryobag vessel contents, the temperature of the contact disc correlates with temperatures recorded by sensors mounted on the inside wall of the bag with an accuracy of ±10%.

Accordingly, the sensor contact disc 815 temperature can be used as an accurate and repeatable metric for the status of the completion of the phase change of the cryobag vessel contents. As such, the interpretation of the temperature profile derived from the sensor contact disc 815 can be used as the primary or exclusive data stream for a completion of thaw algorithm controlling the thawing sequence in the instrument. The application of multiple sensor contacts with the cryobag vessel (as shown in FIG. 7) allows the temperature profile of a cryobag vessel to be measured at different locations on the vessel, and to be integrated into a more complex data processing algorithm that may compensate for temperature gradients within the vessel or within the heater plates, in addition to providing redundant sensors as insurance of functionality in the case the failure of one of the sensors.

Various uses of the thawing apparatus should be understood from the above figures, including, but not limited to, an exemplary sequence of operations described herein. It should be recognized that described sequence of events to follow represents one of many possible specific event sequences that may be applied to the embodiment of the invention, and is not intended to limit in any way the states, stages, or sequence of events that may be associated with the use of the instrument.

At the start of a standard frozen cryobag vessel thawing sequence, the cryobag vessel 260 will not be present inside the instrument. The cantilever push bar 215 will be in a retracted state under the motive force applied by the worm-gear and screw-jack mechanism 290, and in this state, the entire cantilevered assembly 202 and associated mechanically coupled parts (e.g., bearings, heater plates, mat heaters, thermistors, etc.) will also be in a retracted state such that the upper heater plate 240 is suspended above the lower heater plate 230 with a gap interposed between the two heater plates. The gap between the two heater plates provides for freedom of movement of the back wall of the drawer assembly 265, specifically the drawer assembly 265 can move forward without impediment by the upper heater plate 240.

To initiate the thaw sequence, the drawer assembly 265 is extended forward so that the back wall of the drawer 265 is approximately co-planar with the front edges of the upper shell 105 and lower shell 110, thereby making the entire surface of the drawer 265 and the lower heater plate 230 accessible. A frozen cryobag vessel can be held or prepared in a local temperature management environment such as an insulated container with a phase change refrigerant such as dry ice or liquid nitrogen. The frozen cryobag vessel 260 will then be placed onto the lower heater plate 230 surface with the long-dimension midline of the vessel aligned with the long-dimension midline of the lower heater plate 230. The closure of the drawer assembly 265 and commencement of the thawing sequence can be activated through a touch-activated button on the touchscreen 140, and upon this event, the drawer assembly 265 will close by the motive force of the drawer drive gear motor 605. Alternatively, the drawer can be closed by manual force from an operator, and the touchscreen assembly can be used to initiate a thawing sequence. When the drawer assembly 265 is securely closed, the program sequence will activate the worm-gear and screw drive motor 305 that will move the push bar 215 forward, thereby closing cantilevered elements of the internal structure, including the upper heater plate 240 onto the cryobag vessel 260. As the worm-gear and screw mechanism continues to push forward on the push bar 215, the worm-gear housing 310 is displaced toward the support base 360 thereby introducing a compressive force on the captive load cell 355.

The peripheral circuit board 295 microcontroller can receive a signal input from the load cell 355, such that the peripheral circuit board 295 microcontroller can regulate the pressure that the upper heater plate 240 exerts on the captive cryobag vessel 260. Under a compressive force, the predictably uneven surface of the frozen cryobag will make contact with the upper heater plate 240 underside at multiple points, as well as the complimentary surface on the lower heater plate 230. Although initially the contact of the cryobag vessel 260 with the heater plates will be restricted to the high points of the vessel surface, any limitation in thermal energy transfer due to intermittent contact area is transient. As the frozen cell cryomedia typically comprises salts, buffers, proteins, cryoprotective solvents, and other solutes in an aqueous solution, the solid to liquid phase conversion event will occur over a temperature range rather than at a specific temperature point. As a result, during the temperature increase of the thaw, the solid material will experience a progressive reduction in rigidity along with an increase in compliance under pressure that will allow the vessel surface to conform to the heater plate surface. As the surface area of the contact points between the heater plates and the cryobag vessel 260 increases and spreads across the cryobag surface, the overall rate of heat transfer will improve until the maximum contact is achieved. At this point, the contact surface area between the heater plates and the bag surface would be equivalent to the degree of contact that would be obtained by submersion of the vessel in a water bath. As the thermal conductivity of liquid phase is less than that of the solid phase, any accumulation of liquid phase represents a thermal resistance in the thermal path from the heater plate to the solid phase of the vessel contents. In addition to slowing the rate of thermal transfer, the liquid phase will contain thawed cells, and therefore it is imperative that the liquid not be allowed to stagnate at the inner wall of the vessel and continue to warm to a temperature that is deleterious to cell viability.

In part to prevent excessive warming of the liquid phase, the cantilever assembly 202, driven by rocker gear motor 415, can be rocked to keep the cryobag vessel 260 and its contents in motion. In some implementations, rocking of the cantilever assembly 202 can be initiated thirty to sixty seconds (30-60 sec.) into the thaw sequence. The rocker gear motor 415 can be energized by the peripheral circuit board 295 microcontroller, with the eccentric crank 420 introducing a vertical oscillatory displacement in the bearing race 425, and subsequently in the spring arm 430. The oscillatory movement of the spring arm 430, being attached to the upper heater plate through the bracket 435 will create a torsion force in the upper heater plate 230. If the contents of the cryobag vessel 260 are in the solid phase, the upper heater plate 230, under clamping pressure, will be restricted in the range of movement. However, as the liquid phase begins to accumulate within the vessel, a rocking oscillation in the upper heater plate 230 will increase in amplitude and begin movement in the liquid phase, thereby facilitating thermal transfer between both heater plates and the remaining solid phase, resulting in both an increase in the rate of thawing of the solid phase as well as reducing temperature gradients within the liquid phase. As the thawing process continues, and the solid to liquid phase conversion approaches completion, the thaw may be terminated based upon algorithmic triggers that may include, but are not restricted to, the expiration of a simple time interval, or thermometric data collected from the cryobag vessel exterior, or both. Upon achievement of the trigger threshold, the peripheral circuit board 295 microcontroller may reverse the worm-gear and screw drive motor 305 to release the clamping pressure on the cryobag vessel and retract the cantilevered upper heater plate 240. Following the cantilever retraction, the drawer drive gear motor 605 is energized by the microcontroller to extend the drawer 235. Upon full extension of the drawer 265, a user may recover the thawed cryobag vessel 260.

As the spring force is a function of the spring constant and the extension of the spring-components connected to the screw-jack assembly 290, at the position where contact is made by the heater plates with the vessel surface a known and repeatable amount of force per unit area of the vessel can be generated. The variability in the shape of a sample bag vessel when frozen, and thus likely to be at least slightly irregular, can be accounted for or estimated with sufficient confidence during the initial period of time before the contents of the sample bag are substantially in a liquid phase. With the conductivity of the thermal energy transfer pathway established, the rate of heat transfer can be accurately controlled by the regulation of the temperature differential between the heat source and the vessel temperature. With the heat transfer rate controlled, the desired end-point of a thawing process can be accurately calculated and predicted if the mass, the heat capacity, and the starting temperature of the vessel and contents are known. As such, in some embodiments, the correct termination of a thawing process may be regulated even without persistent application of thermal metrology to the vessel contents.

Further, in some embodiments, either or both of the upper heater plate 240 and the lower heater plate 230 can have contours, ridges, or other projections extending from the face of the plate to hold, cradle, or otherwise conform the shape of the sample bag during the thawing process. Such extensions or features of the heater plates, in combination with the amount of pressure exerted by the cantilevered assembly 202 on the sample bag, can aid in providing an even distribution of heating, or local focusing of heating, as appropriate. Further, the structure and pressure of the thawing device can account for volume expansion and change in size of the sample within the sample bag during the thawing process, such that the sample bag retains structural integrity.

It should be recognized that during the sequence of events described in the paragraph above that several variations of the process are available to the programmer of the instrument as well as the end user. For example, in some aspects, a range of cryobag vessel clamping force may be applied ranging from zero Newtons to one hundred Newtons (0 N-100 N) or greater, and the duration and application of clamping pressure may be dynamically altered during the thaw sequence. In other aspects, the wattage applied to the heaters may range from 0 to 1400 Watts, or greater. Other controllable variables include the duration of time the resistive heaters are powered to generate heat, the sequence or order in which the resistive heaters are powered, the distribution of which resistive heaters are powered at any one time, or combinations thereof. The number of heaters installed as well as the region of the heater plate to be in contact with a heater may be varied. In further aspects, the commencement of the agitation introduced through the rocking plate may be modulated as well as the frequency and amplitude of the oscillation may be varied. In addition, the placement and number of the lower heater plate sensors 675 may be varied, such as in a circular, elliptical, or other pattern of distribution within the lower heater plate 230. As such, the instrument may be configured to yield a wide variety of responses to a wide and complex variety of demands, as the thawing situation requires.

Figure 9:
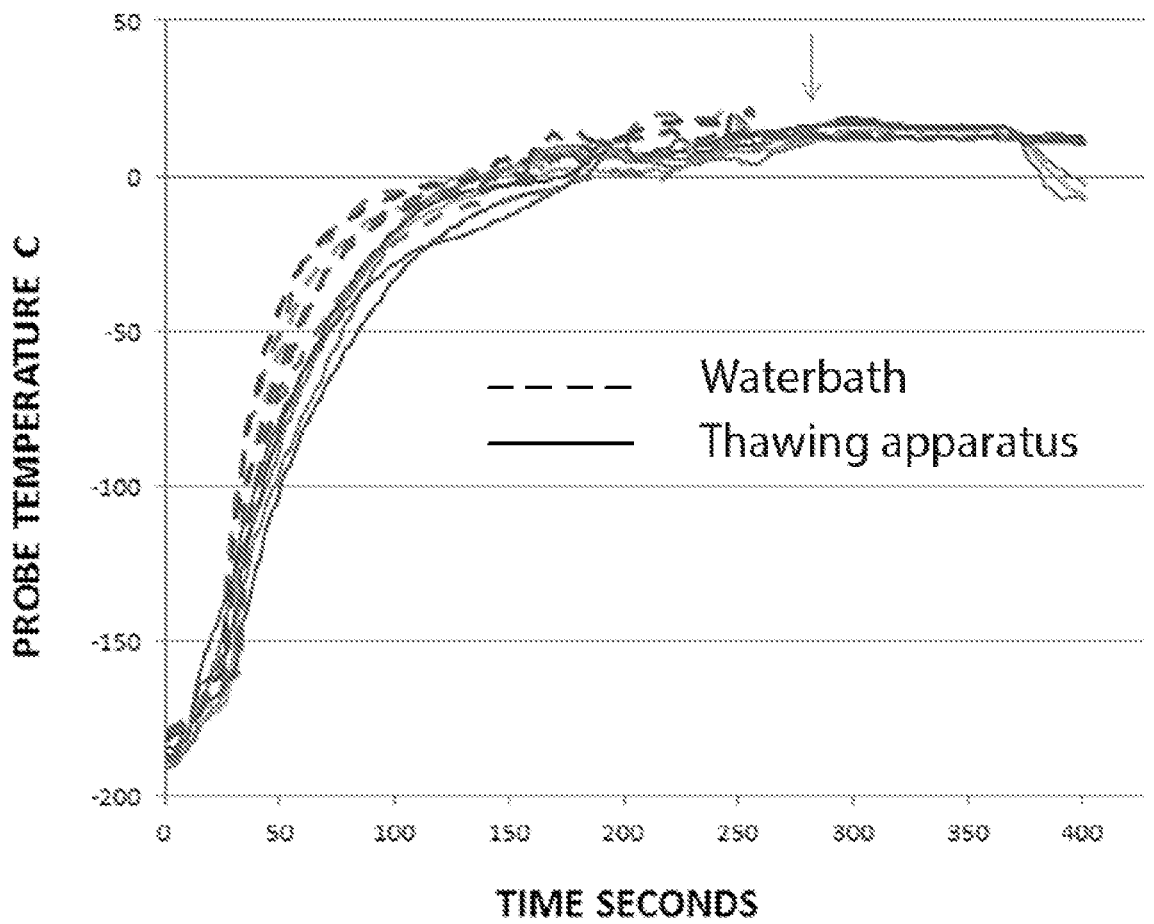
FIG. 9 illustrates a graph of temperature data over time during a thawing of frozen contents inside a commercially available cryobag vessel, as collected from thermocouple sensors embedded inside the vessel, and attached to the inside surfaces.

FIG. 9 illustrates a graph of experimental temperature data over time during a thawing of frozen contents inside a commercially available cryobag vessel. Specifically, the graph of FIG. 9 shows temperature data collected from a set of six thermocouple sensors that were introduced into a nominal 500 ml-size cryobag vessel through one of the filling ports. Within the cryobag vessel, the thermocouple sensors junctions all terminated at an individual solder joint that bonds the thermocouple junction to a copper disc 0.125 inches in diameter and 0.001 inches thick. The copper discs were bonded by an adhesive to the interior wall of the cryobag vessel at various locations that represent distal, middle, and proximal locations with respect to the port features on the cryobag, to as to equally represent both opposite interior walls of the vessel. The bag was filled with a 100 ml volume of a 90% phosphate-buffered saline (PBS) solution and 10% DMSO as a performance proxy for a cryopreservative solution. The cryobag vessel was frozen flat to a temperature of –196° C., then inserted into a plastic overage from which most of the air was subsequently removed prior to sealing with a plastic zip-closure. The vessel and overage were immediately submerged into a water bath that had previously been heated to 37° C. and auto-regulated to maintain the same 37° C. temperature.

As the contents of the cryobag vessel thawed, the temperature data from the thermocouple sensors were electronically collected. Data from thawing in a water bath are shown in dashed line, while data from an embodiment of the thawing apparatus as disclosed herein are shown in solid line. A rapid rise in the dashed trace cluster can be seen when the cryobag was initially submerged in the water bath. The rate of temperature increase began to slow at approximately 50 seconds, and the rate of increase continued to decrease as the phase change of the vessel contents began and the solid material liquefied. At approximately 250 seconds the phase change was nearly complete with only incidental remnants of solid material remaining in the vessel, at which point the cryobag and overage were removed from the water bath. The experimental process was repeated, using an embodiment of the thawing apparatus disclosed herein instead of a water bath to thaw the cryobag vessel contents. As seen in the progression of the solid lines, the data traces rise at a slightly reduced, although similar, rate as the dashed line water bath data. Termination of the thaw using the thawing apparatus occurred at approximately 280 seconds (marked by the downward arrow) based on a termination algorithm that triggered when an external sensor value reached a preset value. The juxtaposition of the two clustered sensor traces indicates that the thawing apparatus is capable of thawing at a rate that is nearly identical to that of a 37° C. water bath.

Figure 10:
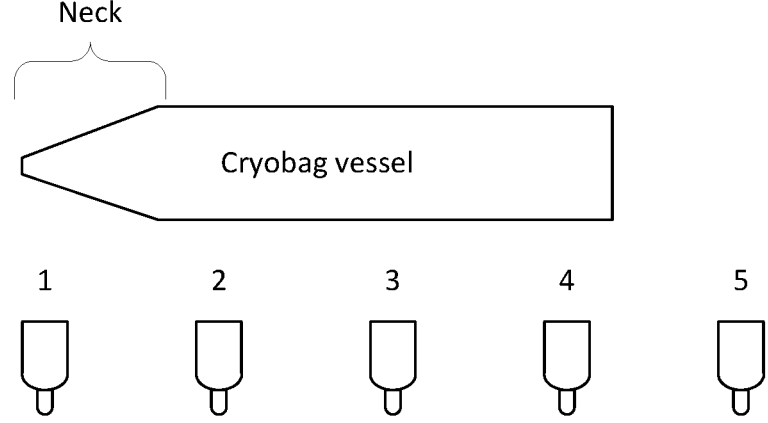
FIG. 10 illustrates a graph of temperature data over time during a thawing of frozen contents inside a commercially available cryobag vessel, as collected from thermocouple sensors embedded in a heater plate upon which the vessel is in contact.
Figure 10:
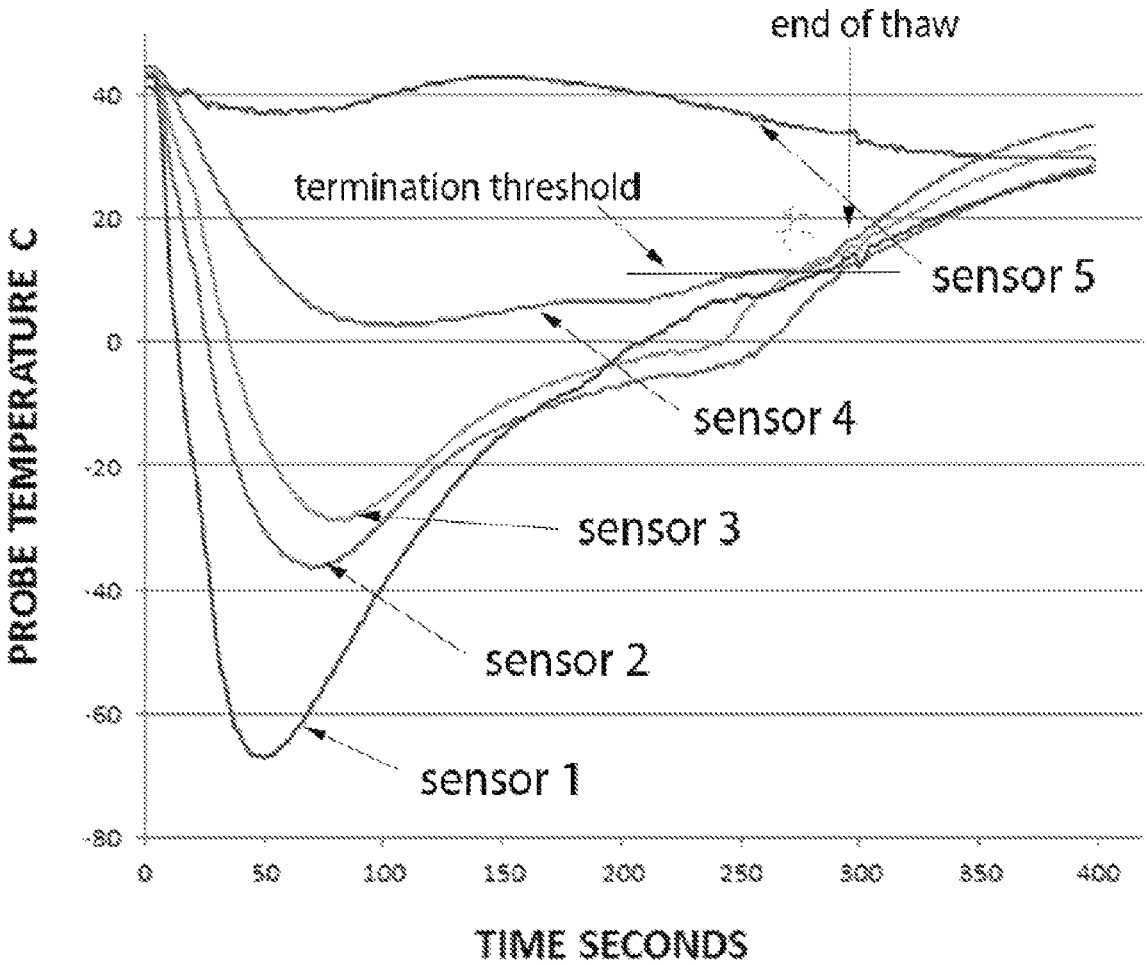

FIG. 10 illustrates a graph of experimental temperature data over time, collected from a set of 5 thermocouple sensors that were mounted in a lower heater plate along the median line of the lower heater plate. Sensor 1 was located at the left-most position (similar to what is shown in FIG. 7), where that position was proximal to the neck end of the cryobag vessel. Indeed, most standard cryobag vessels is positioned on a lower heater plate of the thawing device disclosed herein will have a neck region that will not necessarily interface as completely as other portions of the cryobag vessel. The remaining sensors 2, 3, 4, and 5 are distributed to the right of sensor 1 in increasing numerical order, with sensor 5 being the most distal relative to the neck of the cryobag vessel. Shown for reference is a schematic identifying the position of the cryobag vessel in relation to sensors 1, 2, 3, 4, and 5.

A nominal 500 ml-sized cryobag vessel with a 100 ml load of 90%/10% PBS/DMSO was frozen as in the description of FIG. 9, and subsequently thawed in an apparatus as disclosed herein, and the thermocouple temperature data obtained from the five sensors was collected and is shown in FIG. 10. As the lower heater plate sensor data shows, a dynamic heat flux-dependent temperature for the contact discs (as described in FIG. 8), the temperature minima reported by a given sensor depends on the temperature differential between the lower heater plate local to the sensor and the cryobag vessel surface temperature in contact with the contact disc, as well as the degree or completeness of contact and coupling of the contact disc with the cryobag vessel surface. The exemplary 500 ml cryobag vessel did not have sufficient length to cover all five of the lower heater plate sensors, thus sensor 5 did not contact the cryobag vessel, and therefore lacks the heat sink necessary to create a temperature differential across the sensor resulting in a relatively static temperature profile compared to the other sensors in the plate. In other words, sensor 5 was not in contact with the relatively short cryobag vessel, and thus sensor 5 did not record changes in temperature of the cryobag vessel.

Viewing the data of sensors 1 through 4 which were in contact with the cryobag vessel, there is a bias seen toward a lower temperature minima in a progression from sensor 4 to sensor 1, which is a reflection of the temperature gradient that is established in the lower heater plate in response to the unequal thermal load that is imposed by virtue of the left-biased position of the frozen cryobag vessel that is in contact with the plate. Despite the initial thermal gradient established in the lower heater plate, as the thawing of the vessel contents progresses, the temperature values of the sensors 1-4 coalesce toward an equilibrium state, where that point can thus be used to determine or set the end point of the thaw process. In this example the termination threshold was set to 14° C., with a last trace (from sensor 1) crossing the threshold as the trigger for the end of thaw state at approximately 280 seconds. It should be recognized that multiple trigger algorithms may be applied to use the sensor data as a determinant of the end of thaw state, for example and without limitation: the first sensor trace to cross the threshold, a sensor value average exceeding the threshold, or a weighted sensor value average exceeding the threshold.

The data graph shown in FIG. 10 was taken from an embodiment in which the active lower plate heaters were two mat heater strips that were positioned on opposing sides of the median line on the underside of a lower heater plate, where that median line was coincident with the line on which the thermal sensor array was placed. It can thus be appreciated that that other than energizing or de-energizing the heaters strips there was no option for balancing the thermal gradient that appeared in the underside heater plate 230 in this experimental instance. In other embodiments, where additional heater strips are installed in similar, subdivided, or alternative locations the heaters can be dynamically energized to balance the thermal gradient that appears in the lower heater plate during the thawing process, and that localized reductions in the plate temperature may be compensated for by selectively energizing heaters local to the region of reduced temperature.

In an alternative embodiment, a thawing device as disclosed herein can have a vertical access, such that cryobag vessels are inserted and removed from the top of the device.

Colloquially, the thawing device could be configured like a toaster, and cryobag vessels would be oriented accordingly within the device. Such embodiments would bypass the need for a drawer moving between an open and close position, and would minimize the size of a lid structure, if any were needed.

In some embodiments, multiple algorithms may be provided for determining a thaw end time. Optionally, each of the multiple algorithms may be concurrently run to provide separate estimates for the thaw end time. The system may be configured to end the thawing based on the algorithm which first provides an estimated thaw end time. Optionally, the system may be configured to allow each of the algorithms to complete their estimations and may utilize the shortest thawing interval calculated. In further embodiments, a system may be configured to average the estimated thawing intervals and utilize the averaged thawing interval to determine the thaw end time.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples; alternative implementations may employ differing values or ranges, and can accommodate various increments and gradients of values within and at the boundaries of such ranges.

References throughout the foregoing description to features, advantages, or similar language do not imply that all of the features and advantages that may be realized with the present technology should be or are in any single embodiment of the invention. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents, patent applications, and other references noted above, including any that may be listed in accompanying filing papers, are herein incorporated by reference. Aspects of the invention can be modified, if necessary, to employ the systems, functions, and concepts of the various references described above to provide yet further implementations of the invention.

One or more computing devices may be adapted to provide desired functionality by accessing software instructions rendered in a computer-readable form. When software is used, any suitable programming, scripting, or other type of language or combinations of languages may be used to implement the teachings contained herein. However, software need not be used exclusively, or at all. For example, some embodiments of the methods and systems set forth herein may also be implemented by hard-wired logic or other circuitry, including but not limited to application-specific circuits. Combinations of computer-executed software and hard-wired logic or other circuitry may be suitable as well.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. Additionally or alternatively, the computing device(s) may comprise circuitry that renders the device(s) operative to implement one or more of the methods of the present subject matter.

Any suitable computer-readable medium or media may be used to implement or practice the presently-disclosed subject matter, including but not limited to, diskettes, drives, and other magnetic-based storage media, optical storage media, including disks (e.g., CD-ROMS, DVD-ROMS, variants thereof, etc.), flash, RAM, ROM, and other memory devices, and the like. It can be understood that, as used herein, a "microprocessor" includes a suitable computer-readable medium.

The subject matter of the present invention is described here with specificity, but the claimed subject matter may be embodied in other ways, may include different elements or steps, and may be used in conjunction with other existing or future technologies.

This description should not be interpreted as implying any particular order or arrangement among or between various steps or elements except when the order of individual steps or arrangement of elements is explicitly described. Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A sample thawing device for thawing a frozen biological sample in a bag-format vessel, the sample thawing device comprising:
    a housing;
    a cantilever assembly;
    an upper heating plate supported by the cantilever assembly, the upper heating plate having a top surface;
    a first plurality of heaters thermally coupled to the top surface of the upper heating plate;
    a drawer assembly arranged to actuate between an open position and a closed position;
    a lower heating plate supported by the drawer assembly, the lower heating plate having a top surface and a bottom surface, the top surface facing toward the upper heating plate and configured to receive a bag-format vessel;
    a second plurality of heaters thermally coupled to the bottom surface; and
    one or more thermal sensors embedded in the lower heating plate, the one or more thermal sensors each having a contact disc centered on an insulation disc, the contact disc exposed at the top surface of the lower heating plate.

2. The sample thawing device of claim 1, wherein members of the first plurality of heaters are independently controllable, adapted to control a temperature of localized regions of the upper heating plate.

3. The sample thawing device of claim 1, wherein the upper heating plate has a bottom surface, configured to clamp down on and apply pressure to a bag-format vessel.

4. The sample thawing device of claim 1, wherein members of the second plurality of heaters are independently controllable, adapted to control a temperature of localized regions of the lower heating plate.

5. The sample thawing device of claim 1, further comprising:
    a screw-drive motor configured to drive a clamping motion of the cantilever assembly; and
    a drawer drive motor configured to drive the drawer assembly between the open position and the closed position.

6. The sample thawing device of claim 1, further comprising a rocker motor configured to drive the upper heating plate in an oscillating rocking motion.

7. The sample thawing device of claim 1, wherein the one or more thermal sensors are arranged linearly along a lateral mid-line of the lower heating plate.

8. The sample thawing device of claim 1, further comprising:
    a touchscreen interface; and
    a control unit, configured to receive instructions through the touchscreen interface, and configured to control a feedback circuit that regulates a powering of the first plurality of heaters, a powering of the second plurality of heaters, or a combination thereof.

9. The sample thawing device of claim 1, wherein the insulation disc is a semi-rigid foam material.

10. The sample thawing device of claim 1, wherein the lower heating plate is configured to receive bag-format vessels that are adapted to hold sample volumes of from 10 ml to 500 ml.

11. A sample thawing system for thawing a frozen biological sample in a cryobag, comprising:
    a cantilever assembly;
    an upper heating plate supported by the cantilever assembly, the upper heating plate having a top surface and a bottom surface, the bottom surface configured to clamp upon and apply pressure to the cryobag;
    a screw-drive motor configured to drive clamping motion of the cantilever assembly;
    a first plurality of heaters thermally coupled to the top surface of the upper heating plate;
    a drawer assembly;
    a lower heating plate configured to support a cryobag in the drawer assembly, the lower heating plate having a bottom surface;
    a second plurality of heaters thermally coupled to the bottom surface of the lower heating plate;
    a plurality of sensor islands located on the lower heating plate, the plurality of sensor islands configured and arranged to measure a temperature of the cryobag supported on the lower heating plate;
    a load cell between the screw-drive motor and the cantilever assembly, the load cell configured to measure pressure exerted on the cryobag by the upper heating plate; and
    a control unit configured to receive thermal measurement information from the sensor islands and to receive pressure information from the load cell, the control unit including a feedback circuit, the feedback circuit configured to control each of the heaters thermally coupled to the upper heating plate and the lower heating plate, the feedback circuit configured to control the screw-drive motor based on the pressure measurement information and the thermal measurement information.

12. The sample thawing device of claim 1, wherein the lower heating plate includes a ring flange supporting the insulation disc, and the insulation disc directly supports the contact disc.

13. The sample thawing device of claim 1, wherein the heaters are resistive heaters.

14. The sample thawing device of claim 1, wherein the heaters are mat heaters.

15. The sample thawing system of claim 11, wherein each sensor of the plurality of sensor islands has a contact disc centered within an insulation disc exposed on a top surface of the lower heating plate.

16. The sample thawing device of claim 11, wherein the plurality of sensor islands is distributed aligned along a lateral mid-line of the lower heating plate.

17. The sample thawing device of claim 11, wherein the feedback circuit is configured to control the screw-drive motor based on a rate of thermal energy transfer from the heater plates into the cryobag.

18. A sample thawing device for thawing a frozen biological sample in a bag-format vessel, the sample thawing device comprising:
    a cantilever assembly;
    an upper heating plate supported by the cantilever assembly, the upper heating plate having a top surface;
    a first plurality of resistive heaters thermally coupled to the top surface of the upper heating plate;

a drawer assembly arranged to actuate between an open position and a closed position;

a lower heating plate supported by the drawer assembly, the lower heating plate having a top surface, a bottom surface, and a lateral mid-line, the top surface configured to receive a bag-format vessel;

a second plurality of resistive heaters thermally coupled to the bottom surface of the lower heating plate; and a plurality of thermal sensors embedded in the lower heating plate, each thermal sensor of the plurality of thermal sensors having a contact disc centered within an insulation disc exposed on a top surface of the lower heating plate, wherein the plurality of thermal sensors is distributed aligned along a lateral mid-line of the lower heating plate, the lateral mid-line being equidistant from opposing peripheral edges of the lower heating plate.

19. A sample thawing system for thawing a frozen biological sample in a bag-format vessel, comprising:

a cantilever assembly;

an upper heating plate supported by the cantilever assembly;

a first plurality of mat heaters thermally coupled to a top surface of the upper heating plate;

a drawer assembly configured to actuate between an open position and a closed position;

a lower heating plate supported by the drawer assembly, the lower heating plate having a top surface and a bottom surface, the top surface configured to receive the bag-format vessel in the drawer assembly;

a second plurality of mat heaters thermally coupled to the bottom surface of the lower heating plate, the second plurality of mat heaters including a first mat heater and a second mat heater, the first mat heater adjacent the second mat heater and spaced from the second mat heater by a gap; and a plurality of sensor islands located in the lower heating plate, the plurality of sensor islands configured and arranged in a line along the gap between the first mat heater and the second mat heater, the plurality of sensor islands configured to measure a temperature of the bag-format vessel on the lower heating plate.

20. The sample thawing device of claim 1, wherein the lower heating plate includes a ring flange supporting the insulation disc in a first direction perpendicular toward the top surface of the lower heating plate, and the insulation disc supports the contact disc in a second direction perpendicular toward the top surface of the lower heating plate.

21. The sample thawing device of claim 1, wherein the contact disc has a first surface and a second surface, the first surface being flat, the second surface being opposite the first surface, the second surface being directly on the insulation disc.

* * * * *